United States Patent
Tanabe

(10) Patent No.: US 11,450,495 B2
(45) Date of Patent: Sep. 20, 2022

(54) ACTUATOR AND ACTUATOR MANUFACTURING METHOD

(71) Applicant: MARUWA Corporation, Osaki (JP)

(72) Inventor: Yoshio Tanabe, Osaki (JP)

(73) Assignee: MARUWA Corporation, Osaki (JP)

( * ) Notice: Subject to any disclaimer, the term of this patent is extended or adjusted under 35 U.S.C. 154(b) by 185 days.

(21) Appl. No.: 16/763,672

(22) PCT Filed: Sep. 26, 2018

(86) PCT No.: PCT/JP2018/035791
§ 371 (c)(1),
(2) Date: May 13, 2020

(87) PCT Pub. No.: WO2019/097848
PCT Pub. Date: May 23, 2019

(65) Prior Publication Data
US 2020/0271108 A1  Aug. 27, 2020

(30) Foreign Application Priority Data
Nov. 17, 2017  (JP) .............................. JP2017-221791

(51) Int. Cl.
*H01H 37/32* (2006.01)
*H01H 37/00* (2006.01)

(52) U.S. Cl.
CPC .......... *H01H 37/323* (2013.01); *H01H 37/32* (2013.01); *G03B 2205/0076* (2013.01); *H01H 37/00* (2013.01)

(58) Field of Classification Search
CPC ...... H01H 37/323; H01H 37/32; H01H 37/00; H01H 61/0107; H01H 71/145;
(Continued)

(56) References Cited

U.S. PATENT DOCUMENTS 5,173,043 A * 12/1992 White, Jr. ............... F04C 2/104
418/61.3
6,099,366 A *  8/2000 Shinchi .............. H01R 43/0207
439/594
(Continued)

FOREIGN PATENT DOCUMENTS

CN       101060981 A    10/2007
CN       102171453 A     8/2011
(Continued)

OTHER PUBLICATIONS

Matsuda, Len, "Driving Device and Manufacturing Method Thereof", Feb. 19, 2014, Entire Document (translation of CN 103590989) (Year: 2014).*

(Continued)

*Primary Examiner* — Stephen S Sul
*Assistant Examiner* — Alexander Ryan Horton
(74) *Attorney, Agent, or Firm* — Peter W. Schroen; Bret E. Field; Bozicevic, Field & Francis LLP

(57) ABSTRACT

The object is to provide an actuator that consumes less power.

An actuator comprises: a stator that rotatably supports a plurality of stator rollers; a mover that rotatably supports a mover roller disposed between the stator rollers; and a wire made of a shape memory alloy that is disposed between the stator rollers and the mover roller and has both ends connected to respective two stator terminals provided in the stator.

11 Claims, 34 Drawing Sheets

(58) Field of Classification Search
CPC .... H01H 2085/0004; G03B 2205/0076; G06F 3/0488; G06F 3/016; G06F 3/041; F03G 7/065
See application file for complete search history.

(56) References Cited

U.S. PATENT DOCUMENTS

| | | | |
|---|---|---|---|
| 2008/0145204 A1* | 6/2008 | Clark | F01D 17/16 415/48 |
| 2008/0168914 A1 | 7/2008 | Kark | |
| 2008/0212252 A1* | 9/2008 | Kamata | F16K 31/0675 361/154 |
| 2011/0176047 A1 | 7/2011 | Wakahara et al. | |
| 2013/0145760 A1 | 6/2013 | Gondo | |
| 2013/0154984 A1 | 6/2013 | Gondo | |
| 2014/0339265 A1* | 11/2014 | Marone | A47L 15/4409 337/140 |
| 2015/0275867 A1 | 10/2015 | Gondo | |
| 2015/0369222 A1 | 12/2015 | Fujii et al. | |
| 2016/0102656 A1 | 4/2016 | Fujii et al. | |
| 2017/0284379 A1 | 10/2017 | Krumpelman | |

FOREIGN PATENT DOCUMENTS

| | | |
|---|---|---|
| CN | 103590989 A | 2/2014 |
| JP | H5-1165 U | 1/1993 |
| JP | 2004-113476 A | 4/2004 |
| JP | 2005-226456 A | 8/2005 |
| JP | 2012-221796 A | 11/2012 |
| JP | 2014-055527 A | 3/2014 |
| JP | 2014-088811 A | 5/2014 |
| JP | 2014-088818 A | 5/2014 |
| JP | 2015-232277 A | 12/2015 |
| JP | 5836276 B2 | 12/2015 |
| JP | 2016-006309 A | 1/2016 |
| JP | 5878869 B2 | 3/2016 |
| JP | 2016-079818 A | 5/2016 |
| JP | 2018-178783 A | 11/2018 |
| RO | 127315 A2 | 4/2012 |
| WO | WO2012023605 A1 | 2/2012 |

OTHER PUBLICATIONS

First Office Action for Chinese Patent Application No. 201880073923.6 dated Aug. 2, 2021, with its machine translation, 18 pages.

Notice of Reasons for Refusal for Japanese Patent Application No. 2019-182455 dated Aug. 10, 2021, with its machine translation, 7 pages.

International Search Report for PCT Application No. PCT/JP2018/035791 dated Dec. 25, 2018, 2 pages.

* cited by examiner

FIG. 1
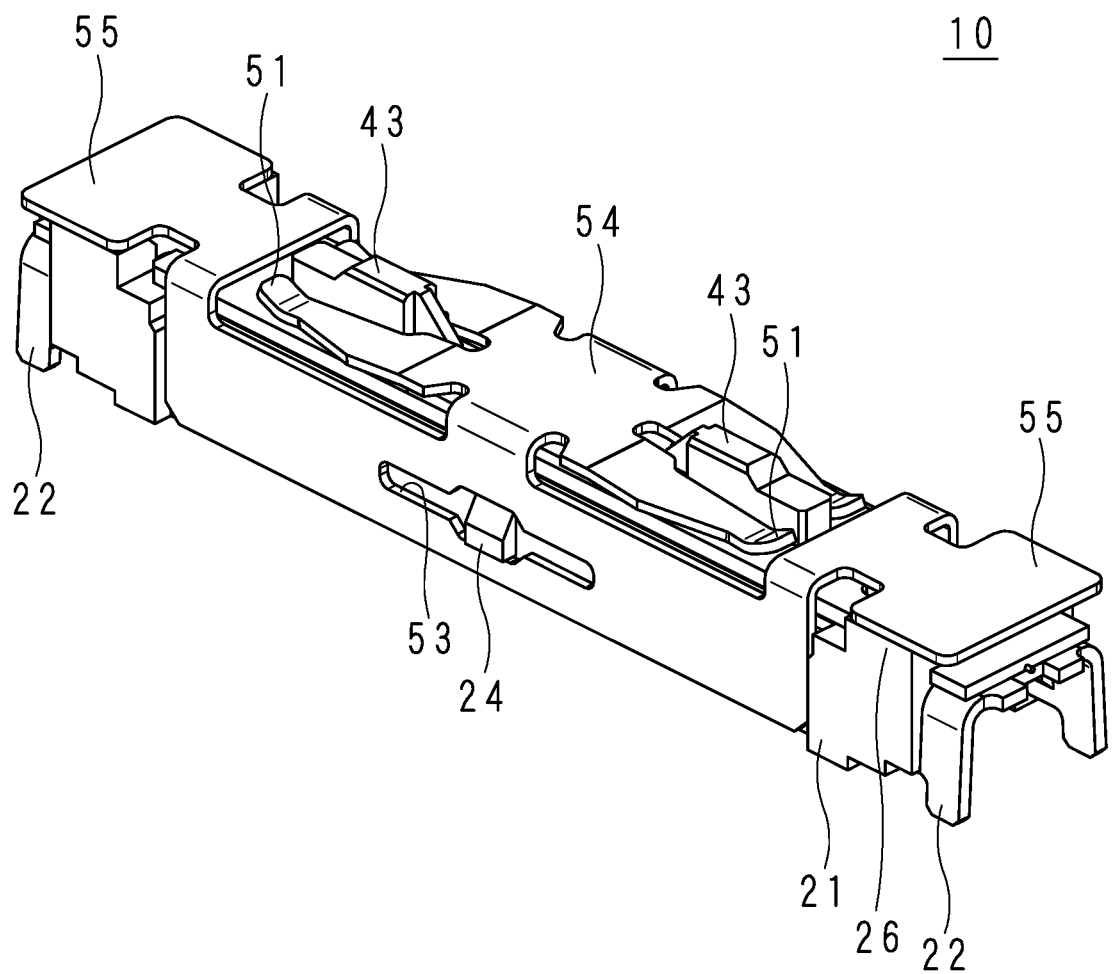
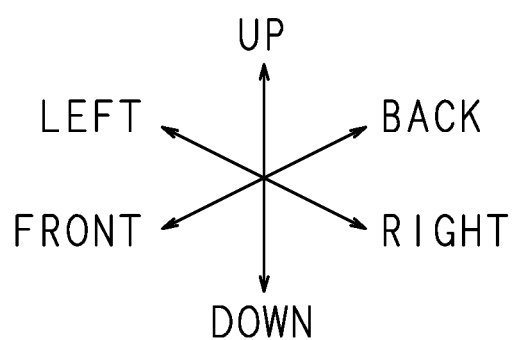

FIG. 6
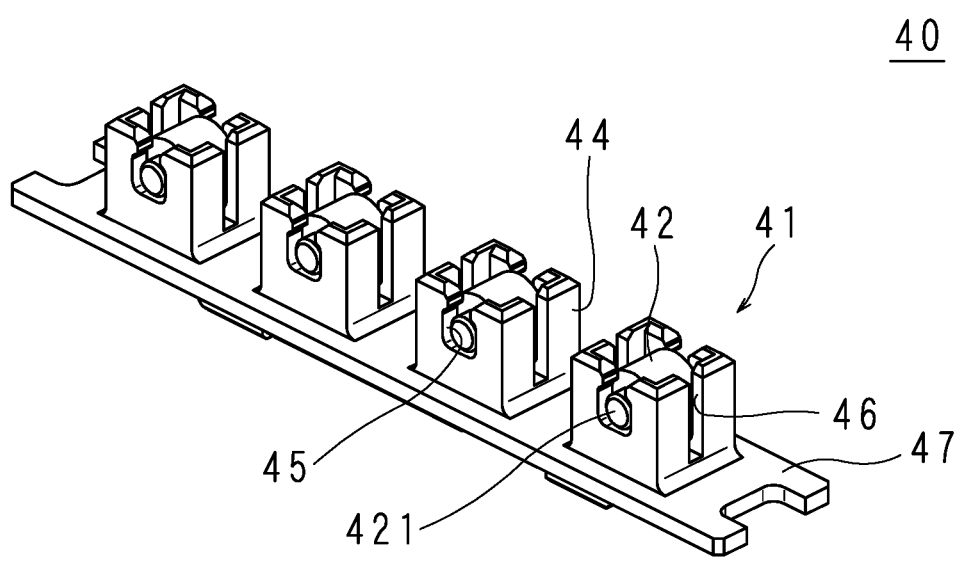
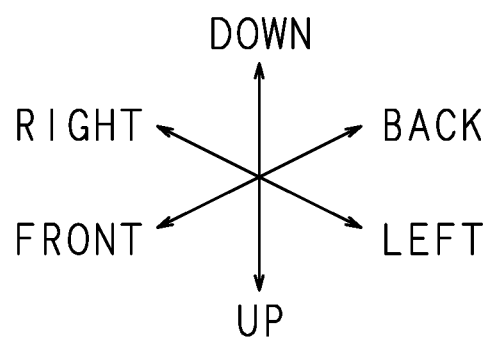

FIG. 7
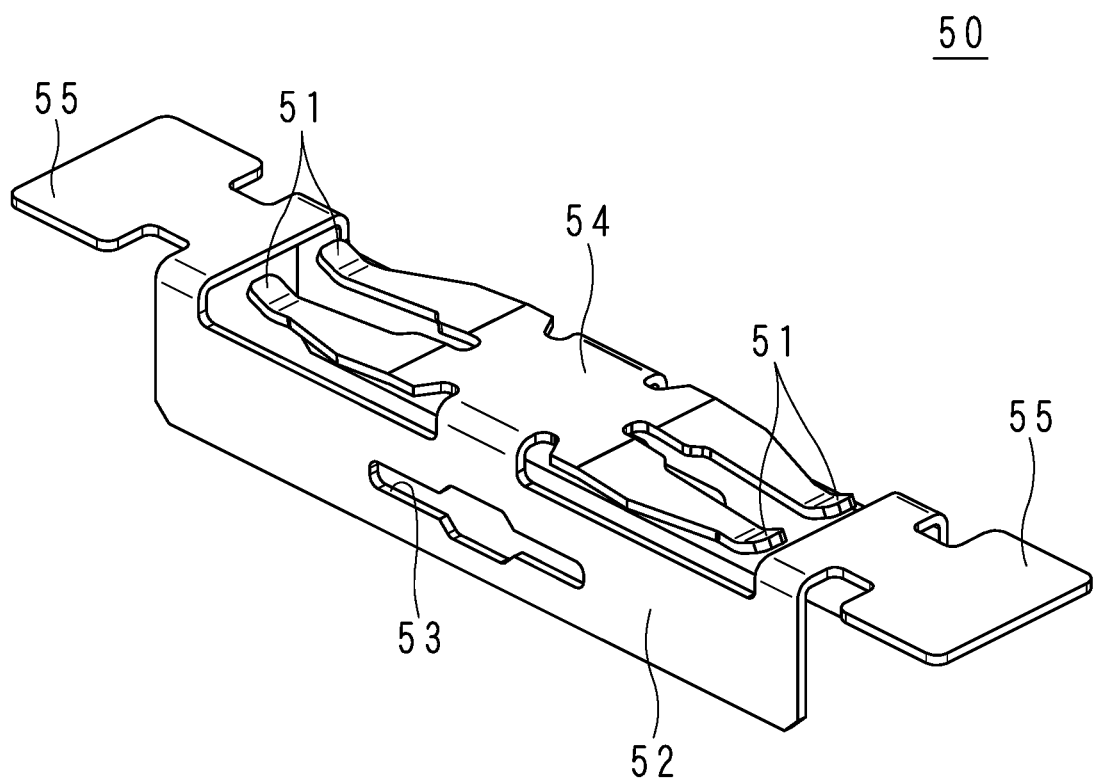
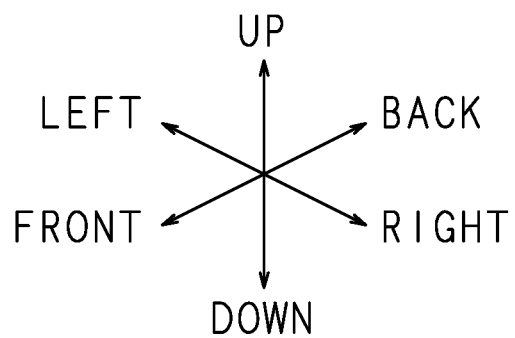

FIG. 14
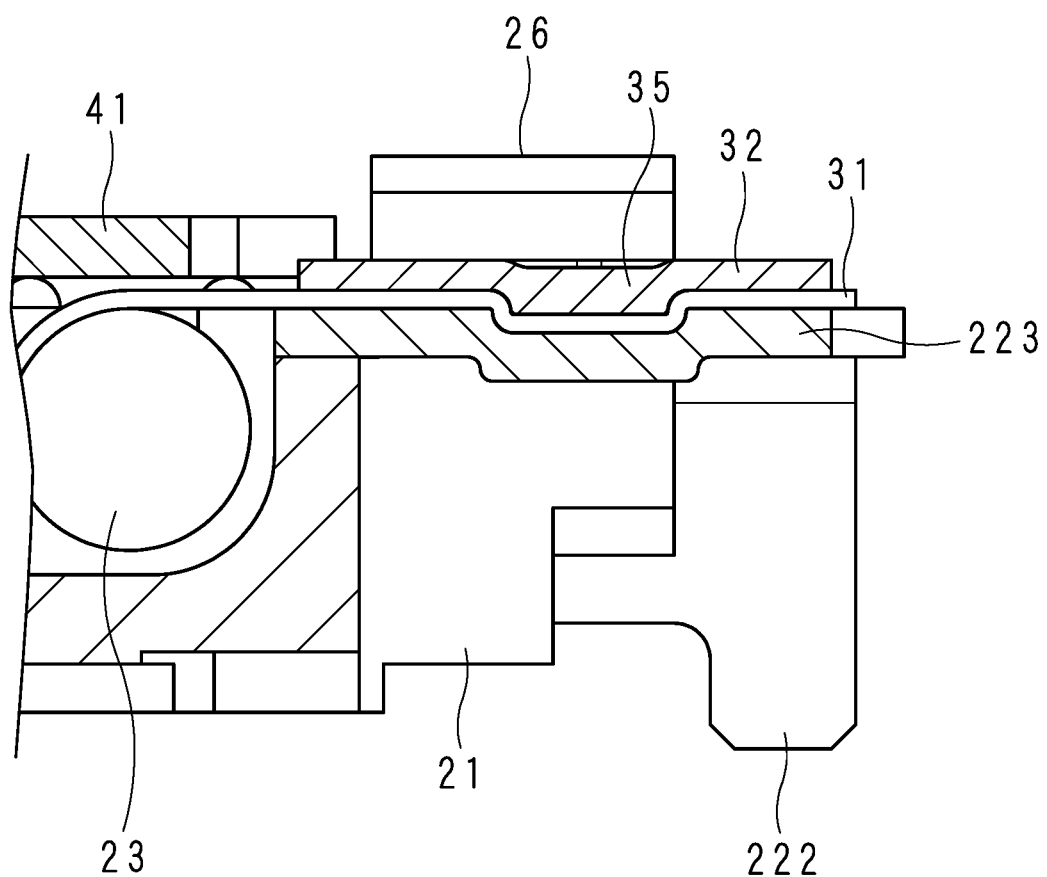
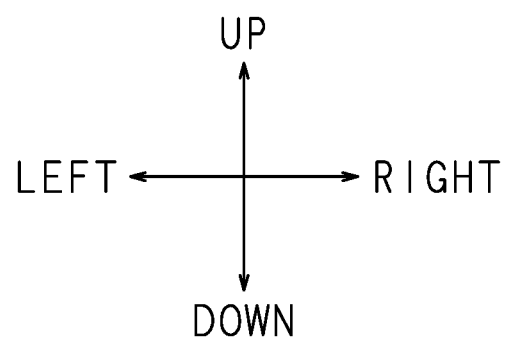

FIG. 18
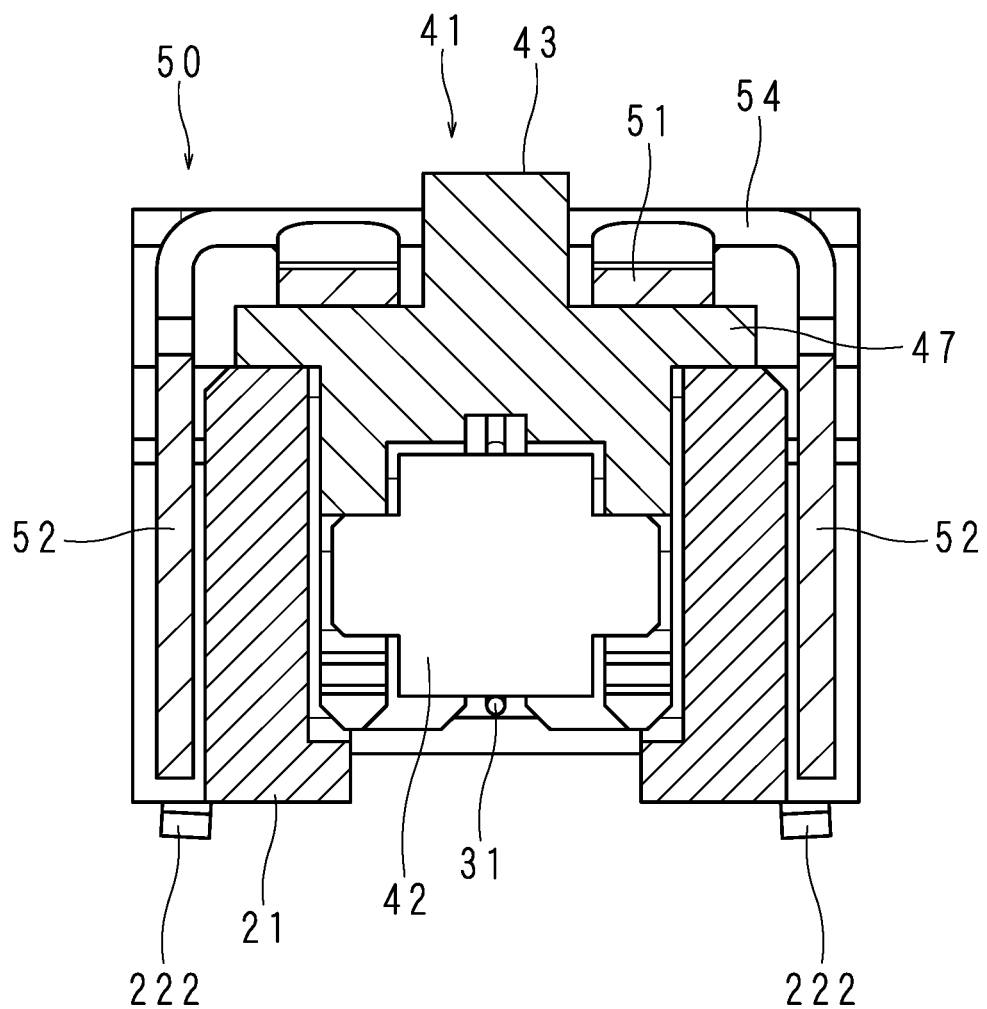
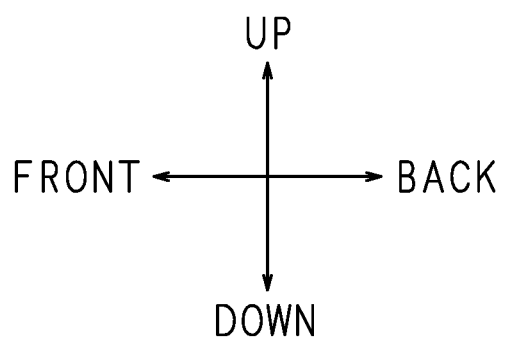

FIG. 19
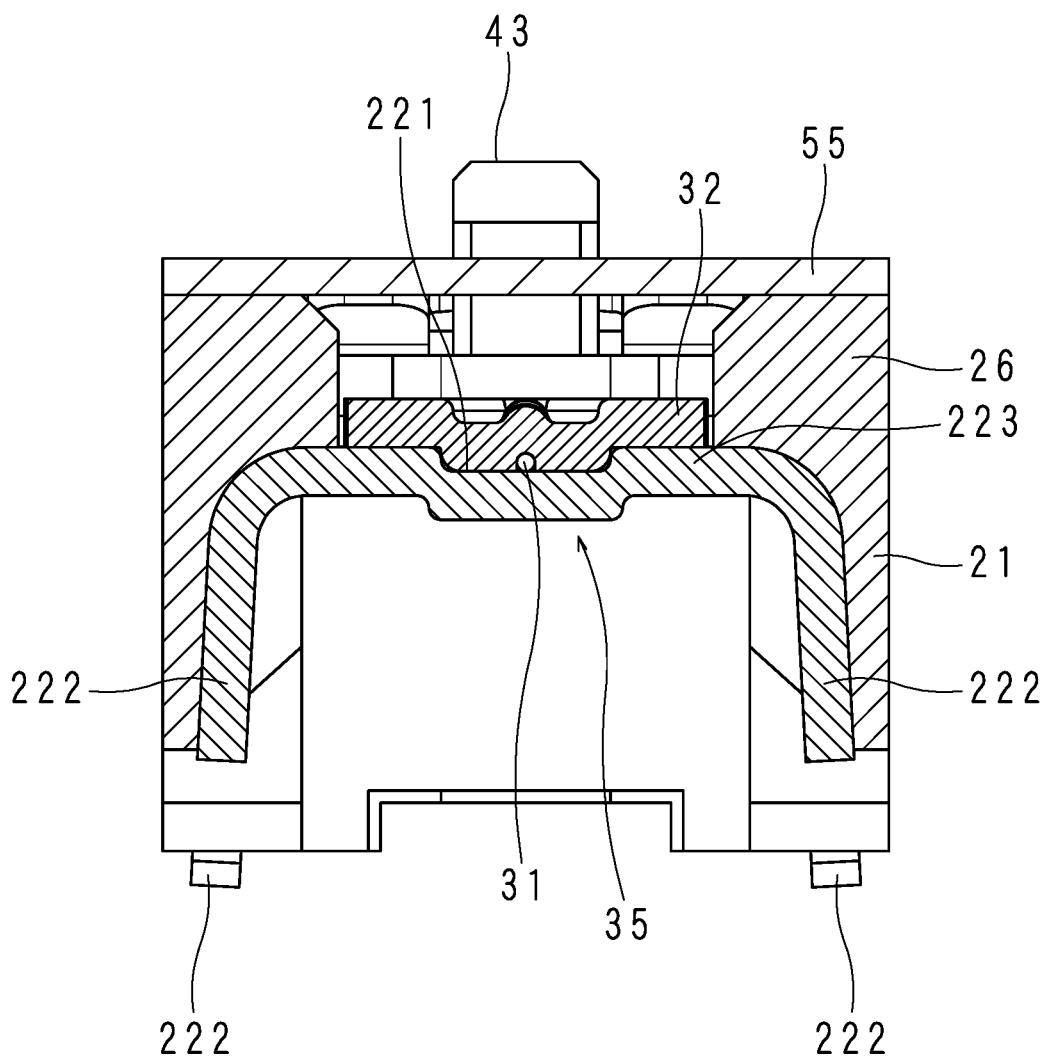
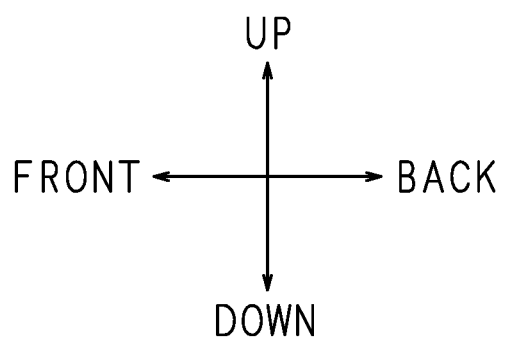

FIG. 21
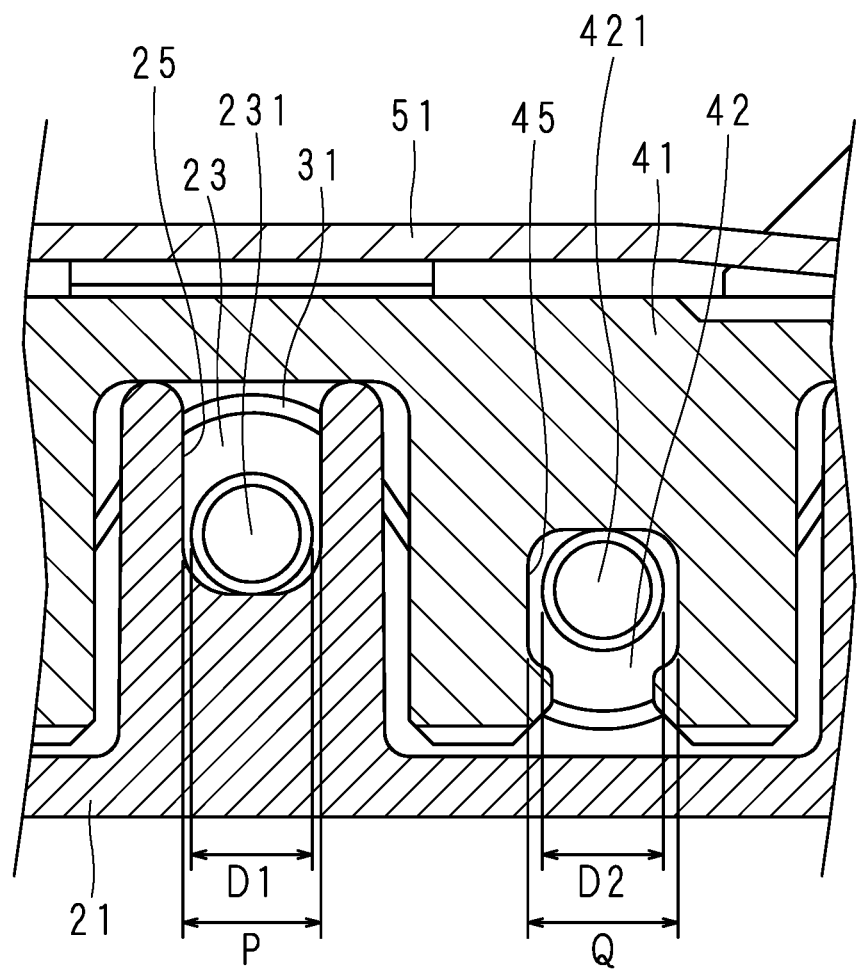
p=P−D1     q=Q−D2
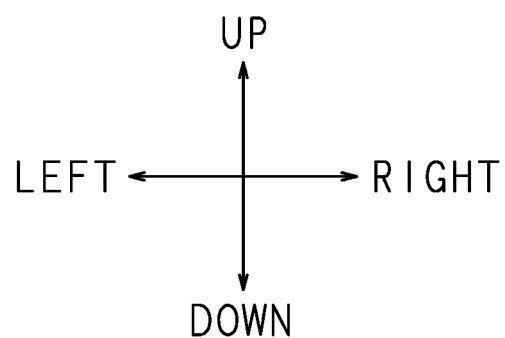

FIG. 29
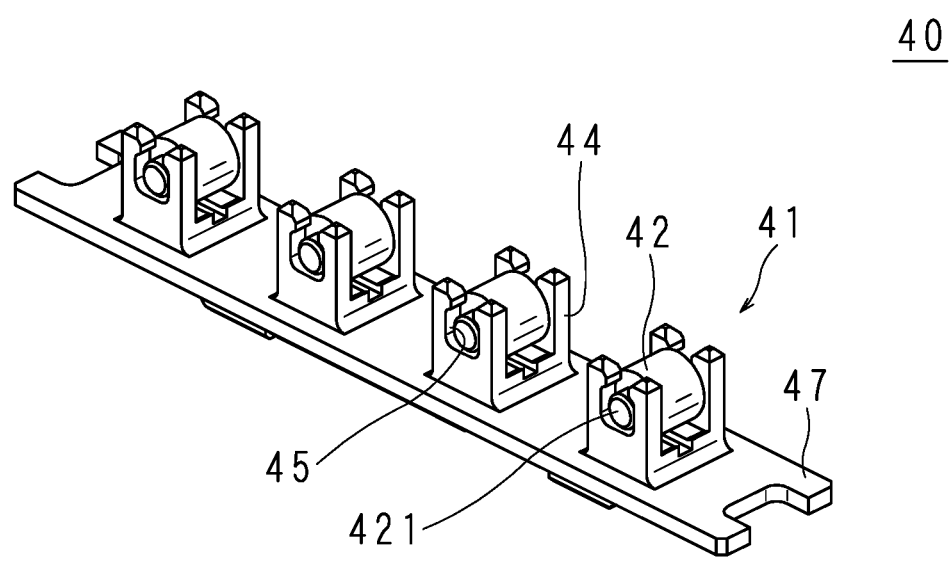
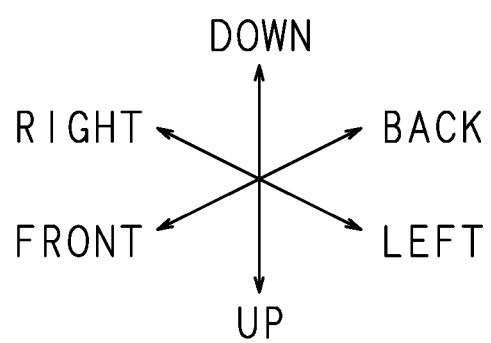

US 11,450,495 B2

ACTUATOR AND ACTUATOR MANUFACTURING METHOD

CROSS-REFERENCE TO RELATED APPLICATIONS

This application is the national phase under 35 U. S. C. § 371 of PCT International Application No. PCT/JP2018/035791 which has an International filing date of Sep. 26, 2018, which claims priority under 35 U.S.C. § 119 on Patent Application No. 2017-221791 filed in Japan on Nov. 17, 2017 and designated the United States of America.

FIELD

The present invention relates to an actuator and an actuator manufacturing method.

BACKGROUND

An actuator has been disclosed in which pulse voltage is applied to a wire made of a shape memory alloy that threads its way through multiple columns made of a thermally conductive material that are arrayed in parallel, to contract the wire by Joule heat and thus move the columns (WO 2012/023605).

The Joule heat generated in the wire is swiftly dissipated through the columns, which returns the length of the wire to its original length. This allows the columns to swiftly return to the original position.

SUMMARY

In the actuator described in Patent Document 1, however, a strong tensile stress may be generated at a part of the wire. If a thick wire is used to prevent the wire from being broken due to the tensile stress, the resistance of the wire is small, resulting in high power consumption in the actuator.

As one aspect, it is an object of the present disclosure to provide an actuator or the like that consumes less power.

An actuator comprises: a stator that rotatably supports a plurality of stator rollers; a mover that rotatably supports a mover roller disposed between the stator rollers; and a wire made of a shape memory alloy that is disposed between each of the stator rollers and the mover roller and has both ends connected to respective two stator terminals provided in the stator.

EFFECTS OF INVENTION

In one aspect, it is possible to provide an actuator or the like that consumes less power.

The above and further objects and features will more fully be apparent from the following detailed description with accompanying drawings.

BRIEF DESCRIPTION OF THE DRAWINGS

FIG. 1 is a perspective view of an actuator.
FIG. 6 is a perspective view of a mover.
FIG. 7 is a perspective view of a fastener.
FIG. 14 is an enlarged view of the part B in FIG. 12.
FIG. 18 is a cross-sectional view taken along line XVIII-XVIII of FIG. 15.
FIG. 19 is a cross-sectional view taken along line XIX-XIX of FIG. 15.
FIG. 21 is an enlarged view of the part C in FIG. 17.
FIG. 29 is a perspective view of a mover in Embodiment 4.

DETAILED DESCRIPTION

Embodiment 1

FIG. 1 is a perspective view of an actuator 10. The following description is made with reference to the front, back, left, right, up and down directions indicated by the arrows in each drawing. The actuator 10 has a substantially rectangular parallelepiped shape elongated in the right-left direction, and has plane symmetry in the front-back direction and in the right-left direction. The actuator 10 is incorporated in an apparatus, for example, a smartphone, a tablet or the like as described below, and makes the user who touches the apparatus have tactile sensation such as a click feeling or the like.

Figure 2:
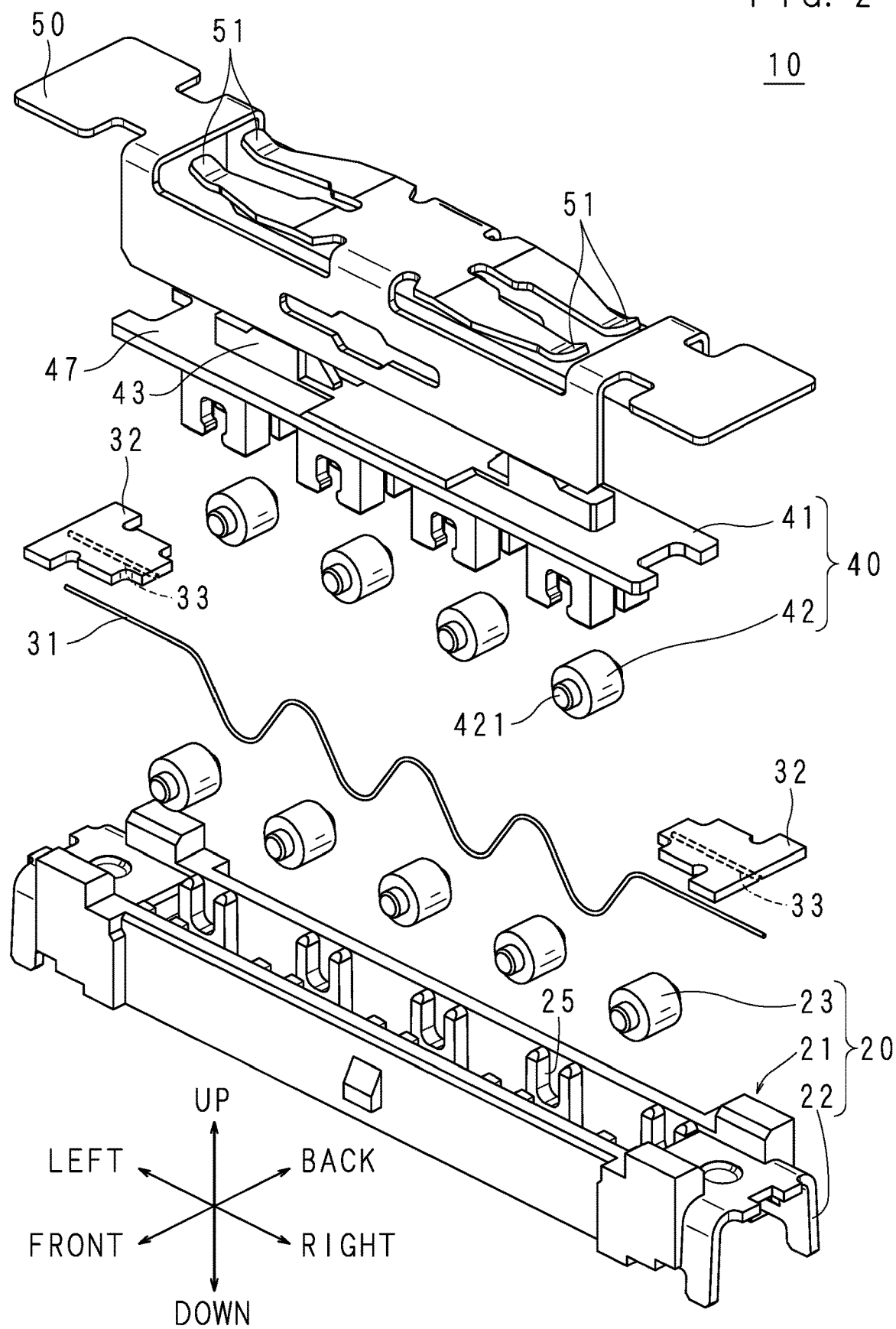
FIG. 2 is an exploded perspective view of the actuator.

FIG. 2 is an exploded perspective view of the actuator 10. The actuator 10 includes a stator 20, a mover 40 and a fastener 50. The stator 20 has a stator frame 21, stator terminals 22 and five stator rollers 23. The mover 40 has a mover frame 41 and four mover rollers 42. The fastener 50 has four biasing springs 51 that press the mover 40 against the stator 20. The details of the structure of the stator 20, the mover 40 and the fastener 50 will be described below.

Figure 3:
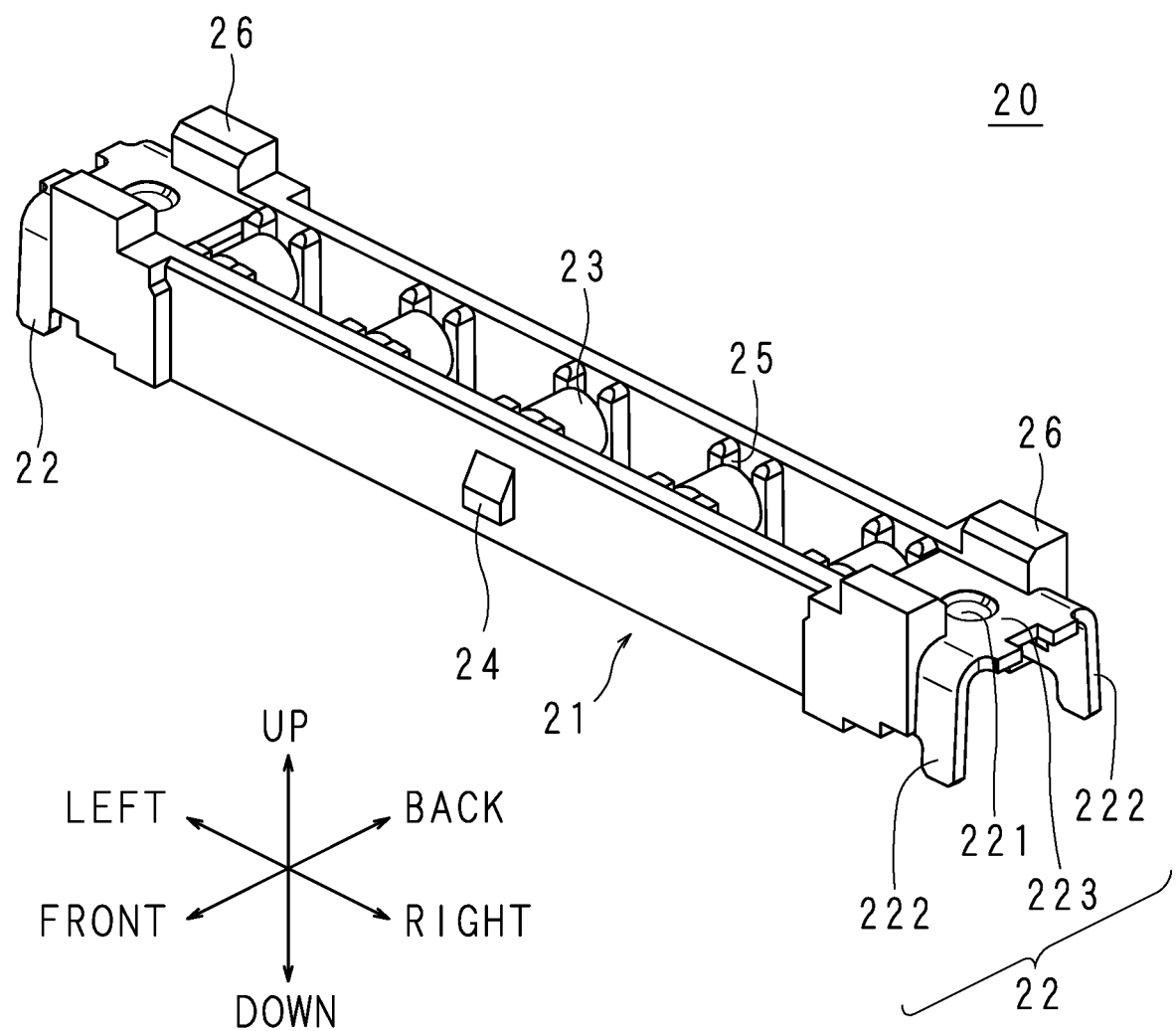
FIG. 3 is a perspective view of a stator.
Figure 4:
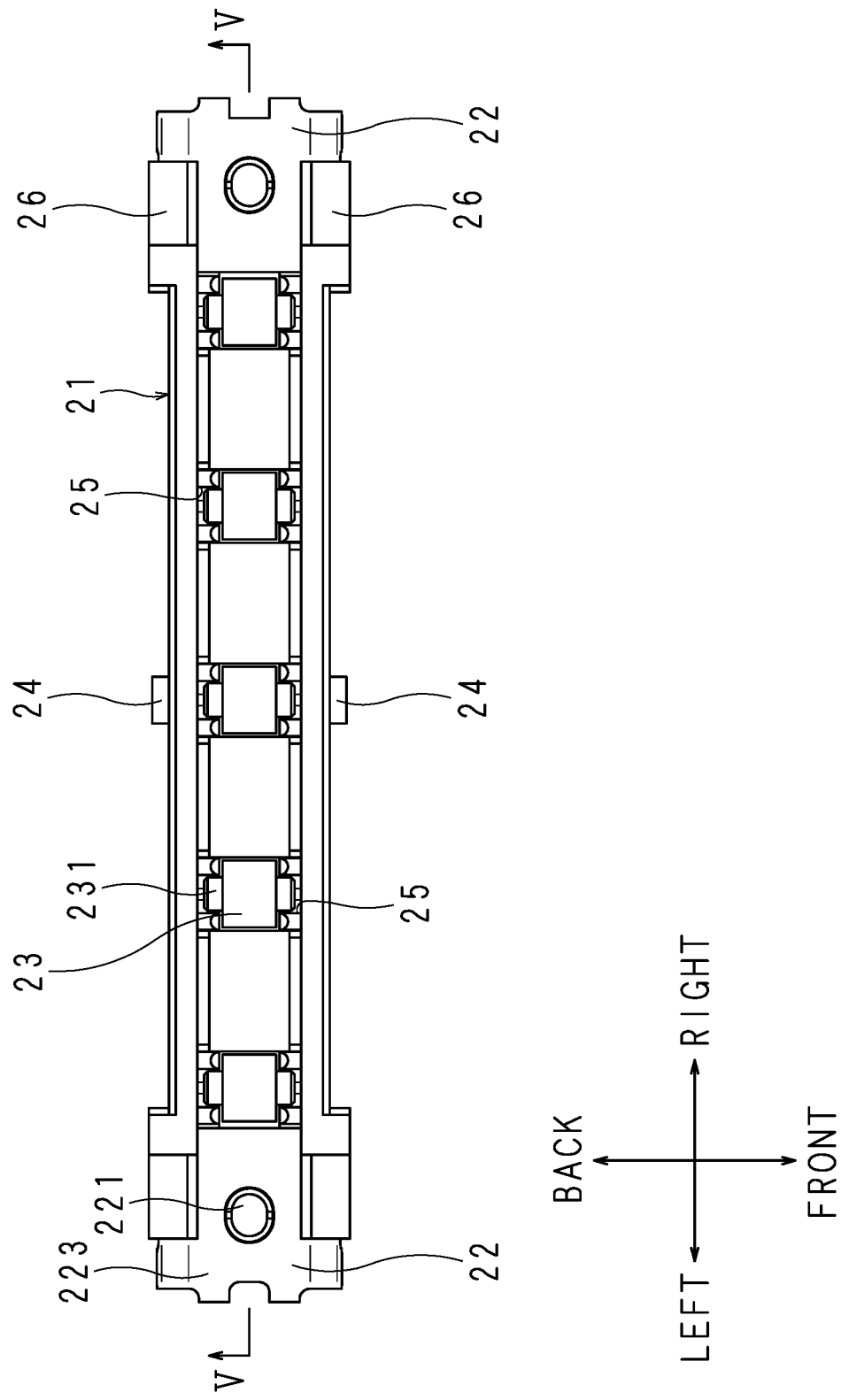
FIG. 4 is a top view of the stator.
Figure 5:
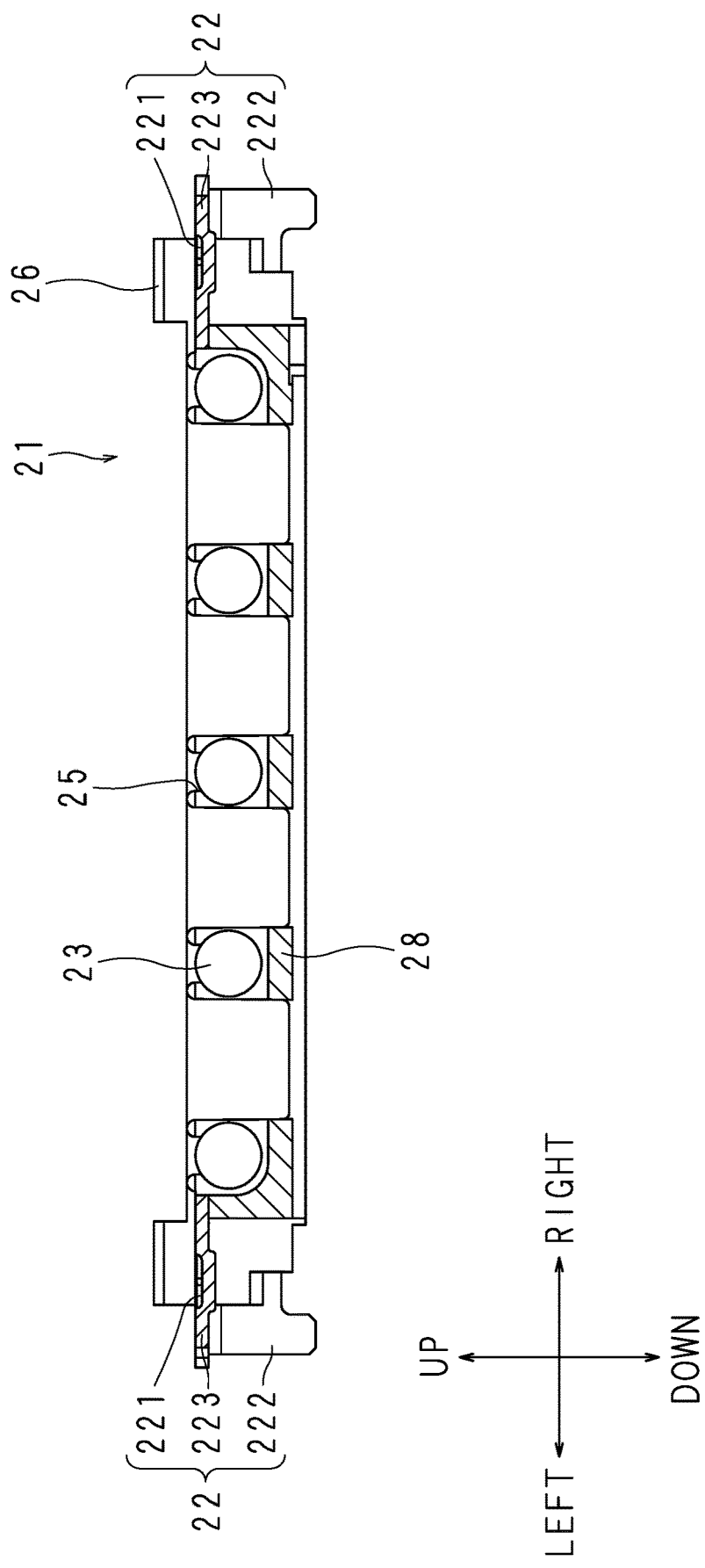
FIG. 5 is a cross-sectional view taken along line V-V of FIG. 4.

FIG. 3 is a perspective view of the stator 20. FIG. 4 is a top view of the stator 20. FIG. 5 is a cross-sectional view taken along line V-V of FIG. 4. With reference to FIGS. 2 to 5, the structure of the stator 20 will be described.

The stator rollers 23 are cylindrical. Each stator roller 23 has cylindrical stator shaft portions 231 coaxially protruding from both end surfaces thereof. That is, the stator roller 23 has a stepped cylindrical shape having the stator shaft portions 231 on both sides that are thinner than the central portion.

The stator roller 23 is made of a material having high thermal conductivity. The material of the stator roller 23 includes, for example, metals such as aluminum, copper or the like, or ceramics such as aluminum nitride, silicon nitride or the like. The stator roller 23 may be made of resin.

The stator frame 21 is a substantially rectangular frame elongated in the right-left direction, and has five pairs of roller supporting portions 25 between the inner surfaces of the front and rear walls thereof. The roller supporting portions 25 in each pair are opposed to each other, and each of the roller supporting portions is a substantially U-shaped groove that opens at the top. The width of the opening portion of the roller supporting portion 25 is a little greater than the diameter of the stator shaft portion 231. A single stator roller 23 is rotatably supported by a pair of opposing roller supporting portions 25.

The front and rear walls of the stator frame 21 are connected to each other by multiple connection portions 28. The connection portions 28 are located under the respective roller supporting portions 25. The connection portions 28 prevent the deformation, such as extension of the stator frame 21 in the front-back direction.

From the four corners of the top surface of the stator frame 21, fastener supporting portions 26 each having a substantially rectangular parallelepiped shape protrude upward. The protruded height of the four fastener supporting portions 26 are the same. At a central part of the outer surfaces of the front and rear walls of the stator frame 21, fastener fixing protrusions 24 having a substantially rectangular parallelepiped shape are provided. The stator frame 21 is made of a material having insulation properties, for example, resin, ceramic, or the like.

The stator terminals 22 are provided on both right and left ends of the stator frame 21. The stator terminals 22 have respective rectangular terminal plate portions 223 outwardly extending from both right and left ends of the top surface of the stator frame 21. From the front and back sides of the terminal plate portions 223, terminal leg portions 222 extend downward. At the central part of the terminal plate portion 223, a terminal concave portion 221, which is a shallow recess, is provided.

Each stator terminal 22 is formed by bending a metal plate having high electrical conductivity such as brass, phosphor bronze or the like. The stator terminal 22 is coated with a layer for easy soldering such as a tin-plated layer, a gold-plated layer, or the like. The two stator terminals 22 are insulated from each other. The two stator terminals 22 are formed as an integral part of the stator frame 21 by insert molding.

It is desirable that the height of the top surface of the right and left terminal plate portions 223 is substantially the same as the height of the upper edge of the five stator rollers 23. The reason will be described later.

FIG. 6 is a perspective view of the mover 40. With reference to FIGS. 2 and 6, the structure of the mover 40 will be described.

The mover rollers 42 are cylindrical. Each mover roller 42 has cylindrical mover shaft portions 421 coaxially protruding from both end surfaces thereof. The mover roller 42 is made of a material having high thermal conductivity.

The mover frame 41 has a top plate portion 47 and four rectangular box-shaped roller holding portions 44. The top plate portion 47 has a substantially rectangular plate shape having substantially the same dimension as the stator frame 21 in the front-back direction and being shorter in the right-left direction than the stator frame 21. The roller holding portions 44 are arrayed in the right-left direction on the lower surface of the top plate portion 47 with the opening portions facing downward. At the central part of the right and left walls of the roller holding portions 44, a first wire passing groove 46 is provided.

At the front wall and the rear wall of the mover frame 41, roller holding grooves 45 are provided. The roller holding grooves 45 each have a substantially U shape and narrows its width at its opening to form a retainer. The width of the roller holding groove 45 is a little greater than the diameter of the mover shaft portion 421. The mover frame 41 is made of a material having insulation properties, for example, resin, ceramic, or the like.

A single mover roller 42 is rotatably supported inside the roller holding portion 44 by a pair of opposing roller holding grooves 45. The action of the retainer provided at the entrances of the roller holding grooves 45 prevents the mover roller 42 from falling even if the top plate portion 47 is placed at the upper side while holding the mover 40.

As illustrated in FIGS. 1 and 2, on the upper surface of the top plate portion 47, two substantially rectangular parallelepiped pressing portions 43 are arranged in the right-left direction. The two pressing portions 43 have the same protruded height.

FIG. 7 is a perspective view of the fastener 50. The structure of the fastener 50 will be described below with reference to FIG. 7. The fastener 50 has two side plate portions 52 that are opposed to each other in the front-back direction. The side plate portions 52 each have a substantially rectangular shape elongated in the right-left direction. The side plate portions 52 arranged in the front-back direction are connected by a connecting portion 54 spanning the space therebetween at the central portion and by supporting plate portions 55 spanning the space therebetween at both right and left sides.

The connecting portion 54 is substantially rectangular and has right and left edges from each of which two biasing springs 51 each having a tapered shape extend. The biasing spring 51 gently bends downward and bends upward near the tip end. Hence, a total of four biasing springs 51 are structured on both right and left sides of the connecting portion 54. The function of the biasing springs 51 will be described later.

The supporting plate portions 55 are each substantially rectangular. The two supporting plate portions 55 are flush with the connecting portion 54. At the central portion of each side plate portion 52, a mounting aperture 53, which is a slot elongated in the right-left direction, is provided. The mounting aperture 53 is wider at the central portion. The function of the mounting aperture 53 will be described below.

The space between the side plate portions 52 in the front-back direction is substantially the same as the dimension in the front-back direction of the stator 20. The length from the left edge of the left supporting plate portion 55 to the right edge of the right supporting plate portion 55 is substantially the same as the length in the right-left direction of the stator 20.

The fastener 50 is produced by bending a metal plate for a flat spring such as a spring stainless steel plate, a beryllium copper plate, or the like that has been cut in a predetermined shape. The fastener 50 may be made of resin.

FIGS. 8 to 12 illustrate an assembly process of the actuator 10. FIGS. 8 to 12 illustrate cross-sectional views of the central portion of the actuator 10 along its lengthwise direction. The actuator 10 is produced by assembly of the stator 20, the mover 40 and the fastener 50 in the following process.

First, as described with reference to FIGS. 3 to 5, the stator shaft portions 231 of the stator roller 23 are inserted into the roller supporting portions 25 of the stator frame 21 to assemble the stator 20.

As described with reference to FIG. 6, the mover shaft portions 421 of the mover roller 42 are inserted into the roller holding grooves 45 of the mover frame 41 to assemble the mover 40. Here, each of the mover shaft portions 421 is pressed against the entrance of the roller holding groove 45 from outside to elastically deform the roller holding groove 45, opening the space between the opposing retainer portions, through which the mover shaft portion 421 enters the roller holding groove 45. Even if the roller holding groove 45 is elastically recovered and the top plate portion 47 is placed at the upper side, the mover rollers 42 do not fall.

Figure 8:
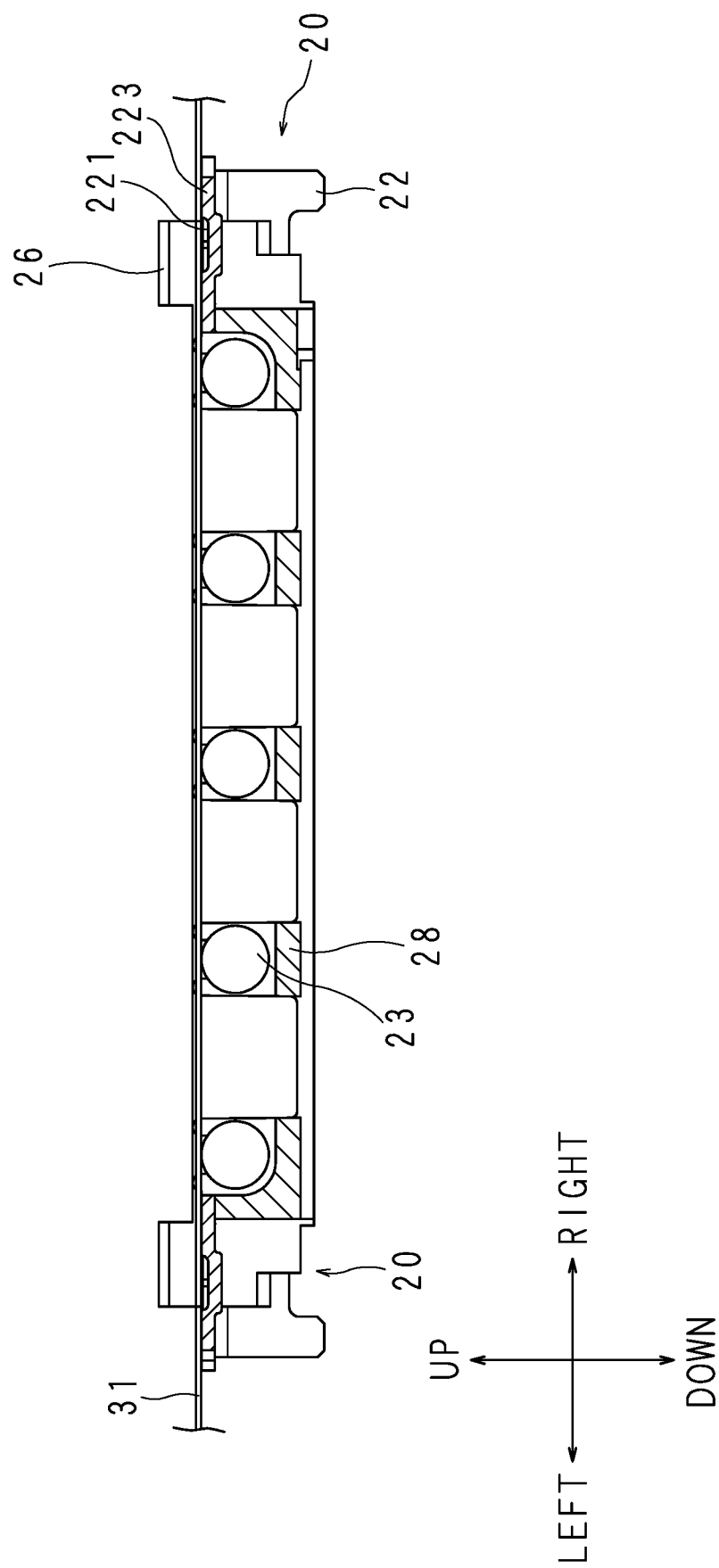
FIG. 8 illustrates an assembly process of the actuator.

As illustrated in FIG. 8, the wire 31 is placed over the stator rollers 23. The wire 31 has a diameter less than 0.1 mm. The wire 31 is capable of passing through the above-mentioned first wire passing groove 46. The wire 31 is made of a shape memory alloy. The wire 31 instantly shortens by approximately 4% to 5% if the temperature exceeds the transformation point, and returns to the original length when cooled. The transformation point of the wire 31 used in the present embodiment is on the order of 70° C. to 100° C.

Figure 9:
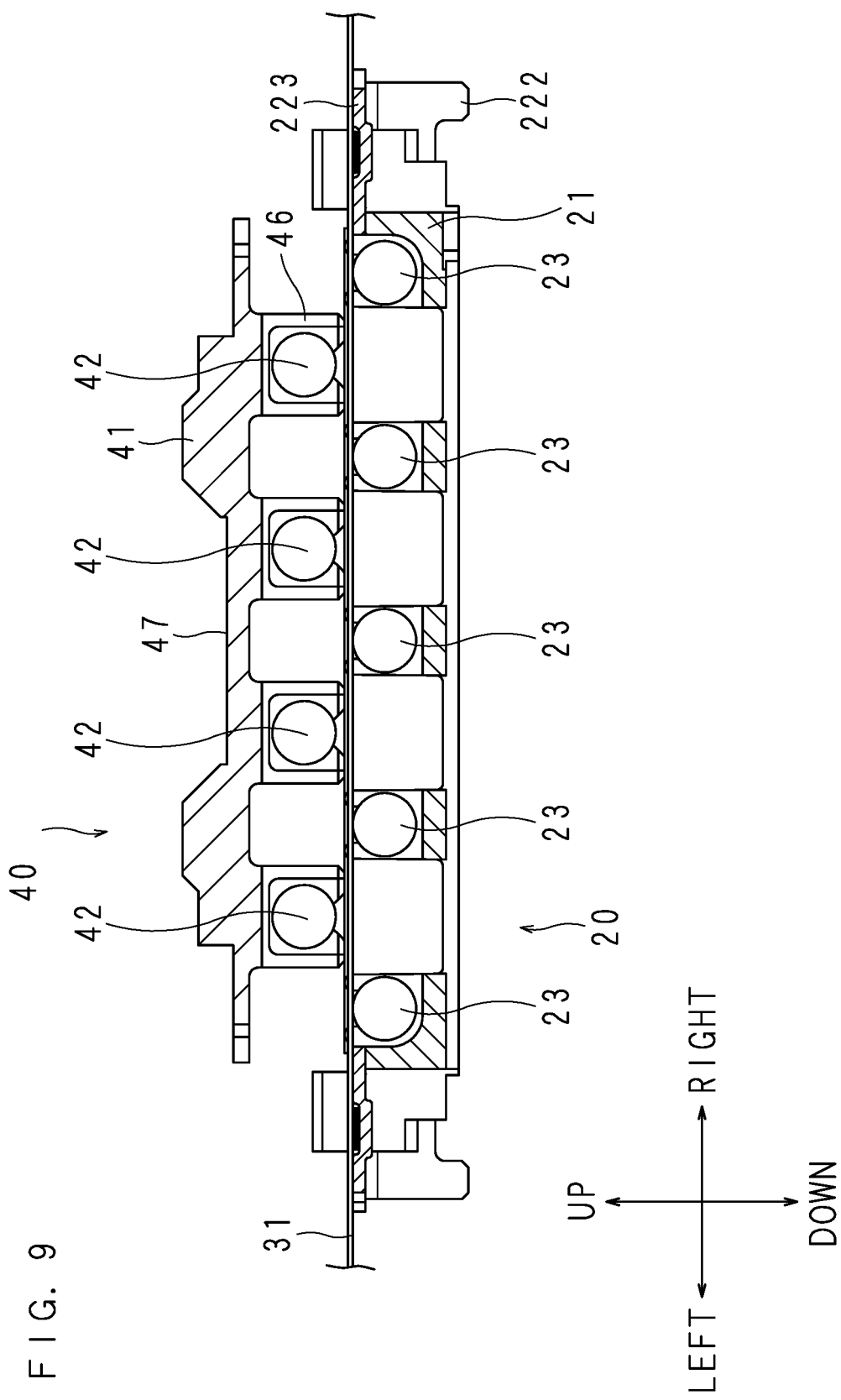
FIG. 9 illustrates the assembly process of the actuator.

As illustrated in FIG. 9, the mover 40 is positioned such that the mover rollers 42 are opposed to the respective clearances between the stator rollers 23. Here, the mover 40 is placed such that the first wire passing groove 46 is aligned with the wire 31 in the front-back direction.

Figure 10:
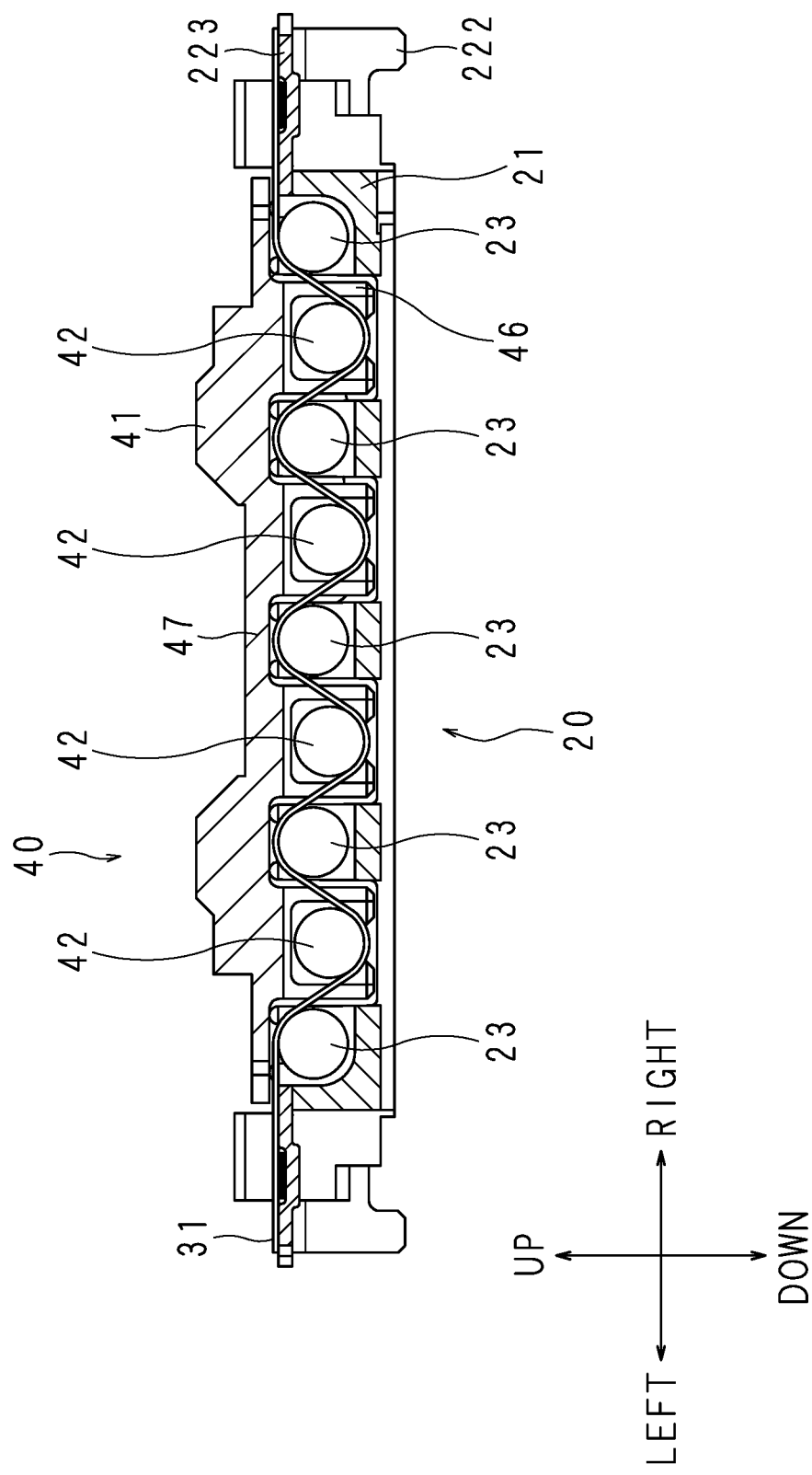
FIG. 10 illustrates the assembly process of the actuator.

As illustrated in FIG. 10, the mover 40 is brought closer to the stator 20 such that the mover rollers 42 and the mover frame 41 are inserted into the stator frame 21. As illustrated in FIG. 2, between the inner surfaces of the front wall and the rear wall of the stator frame 21, concavities are formed between the roller supporting portions 25 to receive the respective roller holding portions 44.

The wire 31 is drawn into the interior of the stator frame 21 by rotations of the stator rollers 23 and the mover rollers 42 to have a wavy shape alternately passing through the upper side of the stator rollers 23 and the lower side of the mover rollers 42. The wire 31 passes through the first wire passing groove 46 between the stator rollers 23 and the mover rollers 42. The function of the first wire passing groove 46 will be described later.

The action of the stator rollers 23 and the mover rollers 42 can prevent a trouble, for example, a break in the wire 31 or the like during assembly due to excessive tensile stress applied to a part of the wire 31. This makes it possible to achieve installation of the stator 20 and the mover 40 at high speed and high yielding.

It is noted that the condition of the wire 31 and the underside of the mover rollers 42 can be confirmed from the bottom surface side of the stator frame 21. A camera may be disposed on the bottom surface of the stator frame 21 so as to detect in real time the presence or absence of abnormality such as slippage or the like of the wire 31 by image processing.

Figure 11:
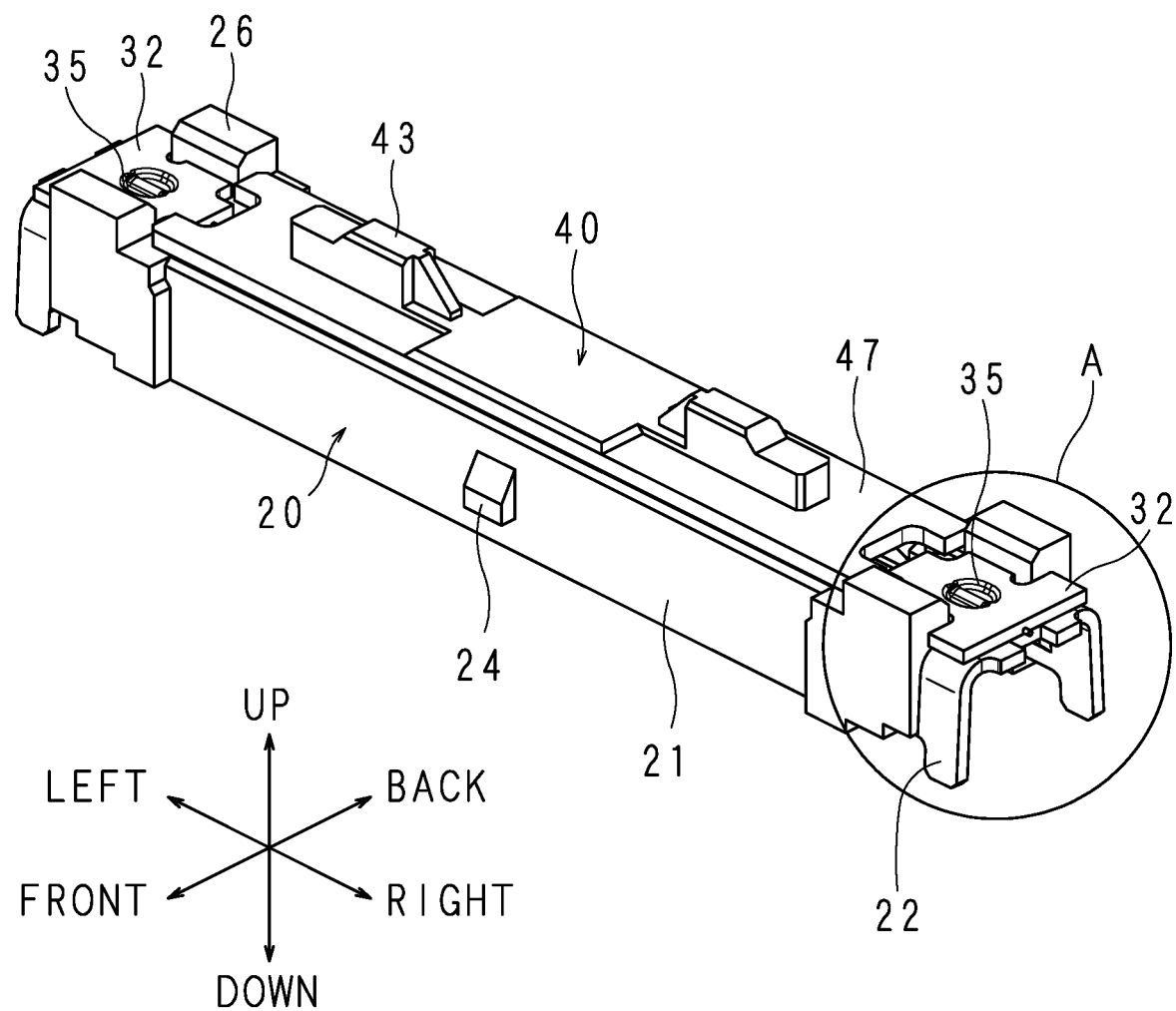
FIG. 11 illustrates the assembly process of the actuator.
Figure 12:
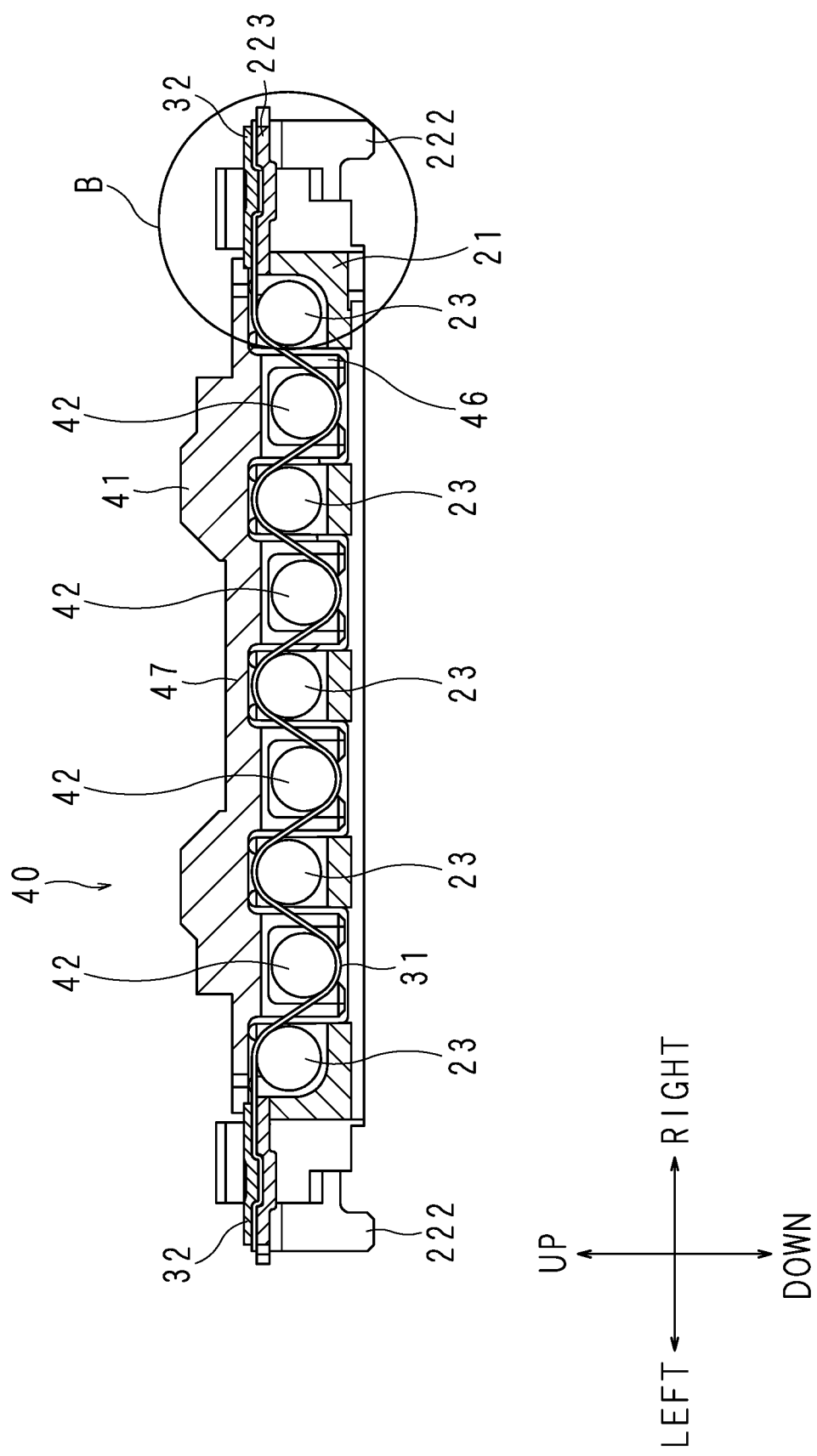
FIG. 12 illustrates the assembly process of the actuator.
Figure 13:
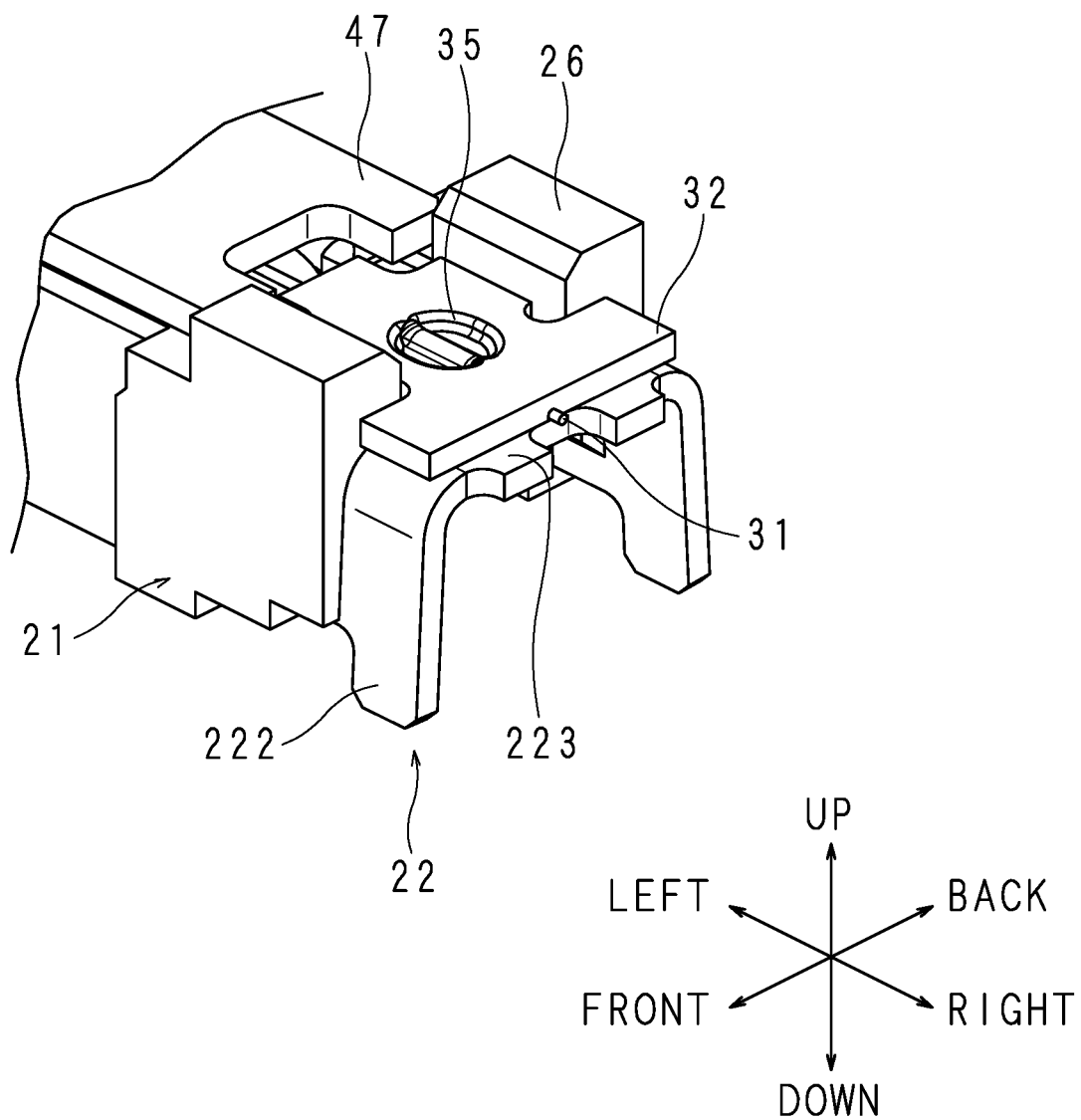
FIG. 13 is an enlarged view of the part A in FIG. 11.

As illustrated in FIGS. 11 and 12, the wire 31 is placed between the terminal plate portion 223 and the second terminal plate 32 so as to be swaged and fixed. FIG. 13 is an enlarged view of the part A in FIG. 11. FIG. 14 is an enlarged view of the part B in FIG. 12. With reference to FIG. 2 and FIGS. 11 to 14, the swaging will be described.

As illustrated in FIG. 2, the second terminal plate 32 is a substantially T-shaped plate. The second terminal plate 32 has a wire holding groove 33 on the bottom surface of the portion corresponding to the leg of the "T" as illustrated by the broken line. The wire holding groove 33 is a U-shaped groove having substantially the same width and depth as the contour of the wire 31. The second terminal plate 32 is made of a metal having high electrical conductivity such as brass, phosphor bronze, or the like.

The second terminal plate 32 is disposed on the terminal plate portion 223 with the wire 31 fit into the wire holding groove 33. A punch is pressed from above the second terminal plate 32 to the position corresponding to the terminal concave portion 221 while the bottom surface of the terminal plate portion 223 is supported by a die to thereby swage and fix the terminal plate portion 223, the wire 31 and the second terminal plate 32, creating a swaged portion 35.

By using the punch with a groove at the position corresponding to the wire 31, the swaged portion 35 is formed such that the position above the wire 13 is raised in a striped shape as illustrated in FIG. 13. As illustrated in FIG. 14, the terminal plate portion 223 and the second terminal plate 32 are plastically deformed without the wire 31 being less crushed, and this can prevent a break in the wire 31.

At the swaged portion 35, the wire 31, the stator terminal 22 and the second terminal plate 32 are electrically and mechanically connected. This allows for better electrical conduction between the wire 31 and the stator terminal 22. Then, the redundant wire 31 positioned outside the stator terminal 22 is cut and removed on both sides, which brings about a state where the wire 31 are connected at both ends to the respective stator terminals 22.

Next, the fastener 50 is placed over the mover 40 to engage the mounting apertures 53 with the fastener fixing protrusions 24. The details will be described below. As illustrated in FIG. 3, the top surface of the fastener fixing protrusion 24 is outwardly tilted. The lower edge of the fastener 50 spreads over the top surface of the fastener fixing protrusion 24. As described above, the mounting aperture 53 is a slot, through which the fastener fixing protrusion 24 can pass by elastic deformation. After the fastener 50 allows the fastener fixing protrusion 24 to pass through the mounting aperture 53, it is elastically recovered. Hence, the fastener fixing protrusion 24 is engaged with the mounting aperture 53 as illustrated in FIG. 1.

The mover 41 is pressed against the stator 20 by the biasing spring 51. As described above, a total of four biasing springs 51 are provided on the right and left sides of the connecting portion 54, so that the front, back, right and left parts of the mover 40 are evenly pressed against the stator 20. This brings about a state where the pressing portions 43 protrude upward from the spaces between the biasing springs 51 on the right and left sides as illustrated in FIG. 1. Hence, the actuator 10 illustrated in FIG. 1 is finished.

Figure 15:
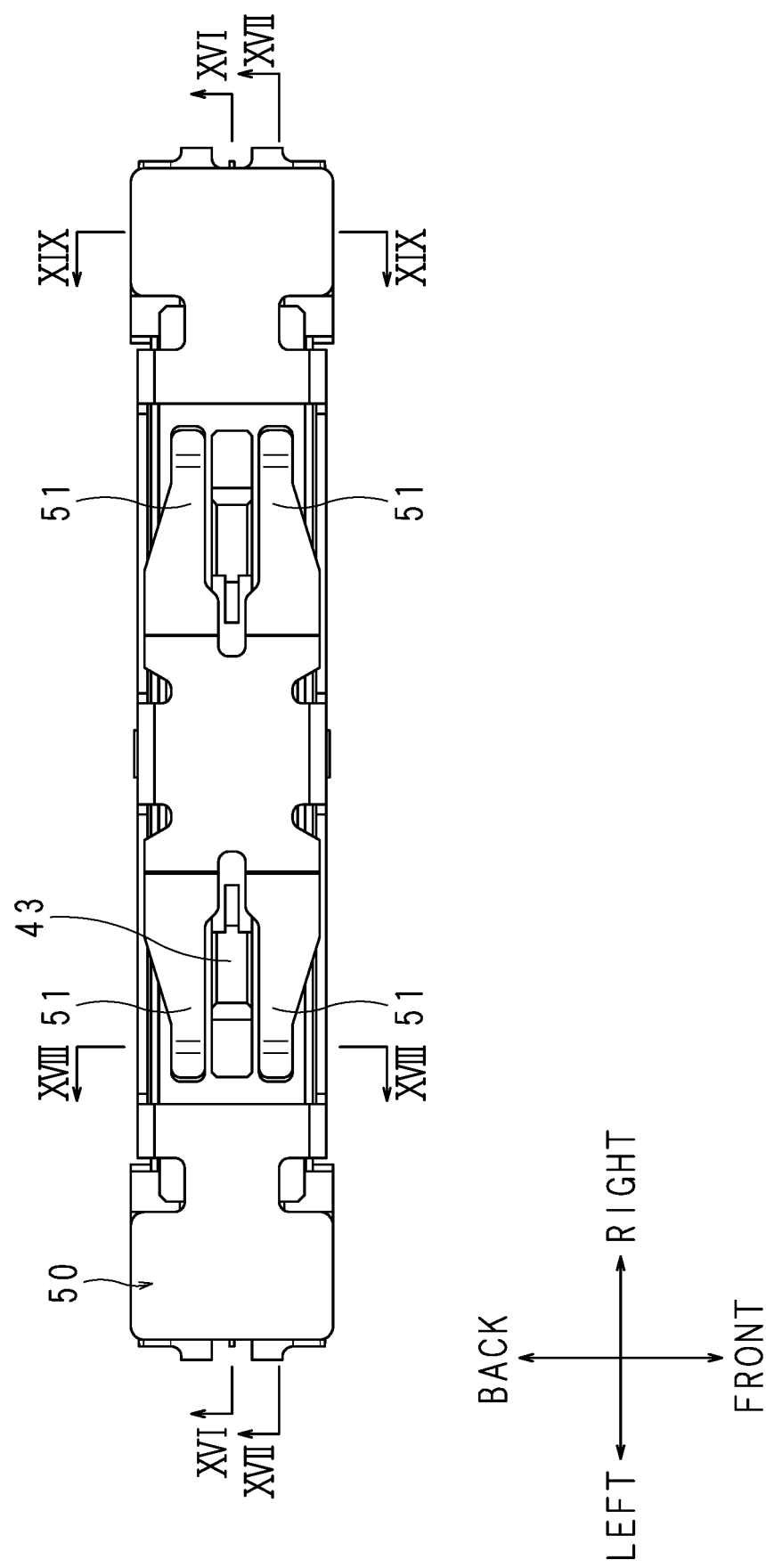
FIG. 15 is a top view of the actuator.
Figure 16:
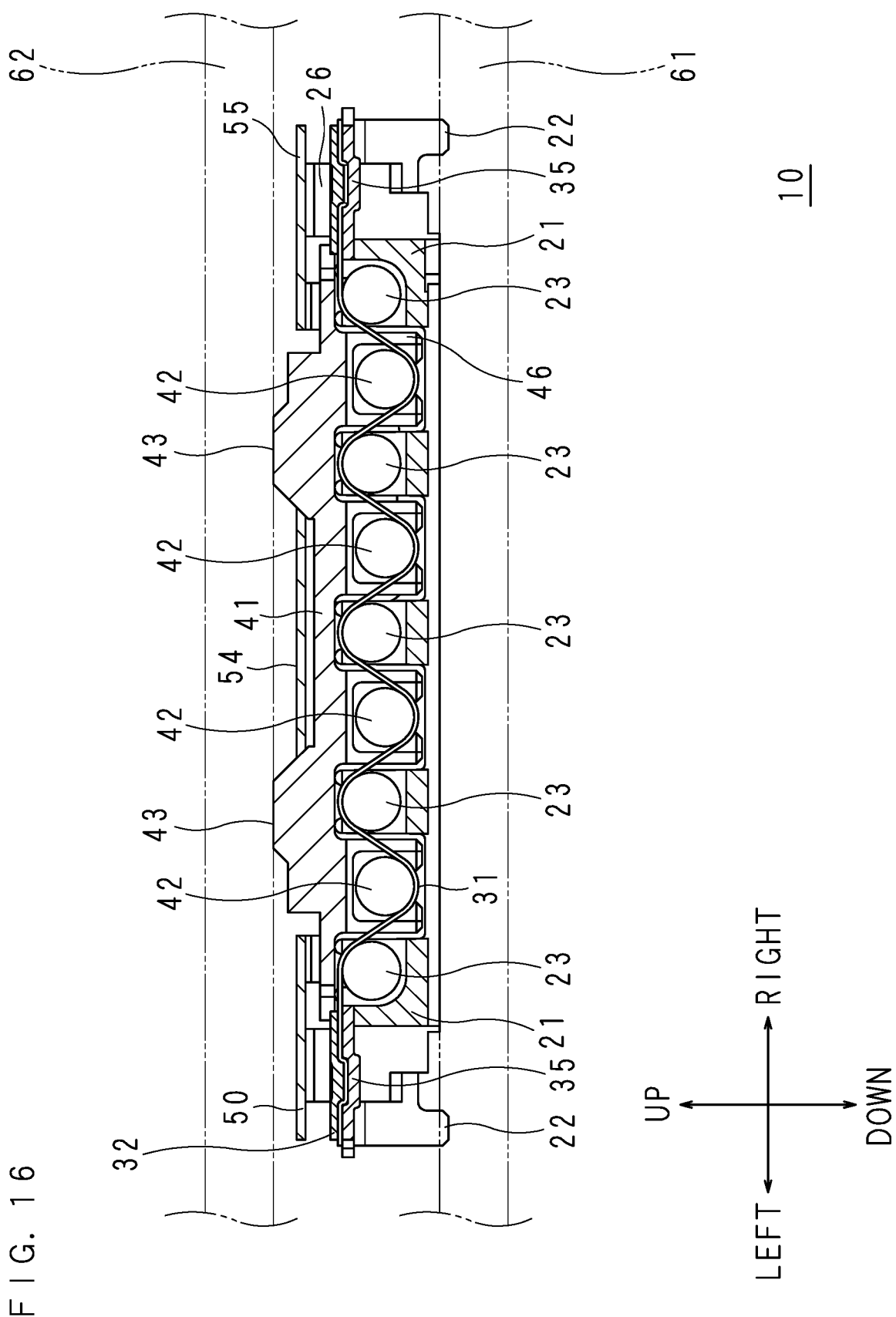
FIG. 16 is a cross-sectional view taken along line XVI-XVI of FIG. 15.
Figure 17:
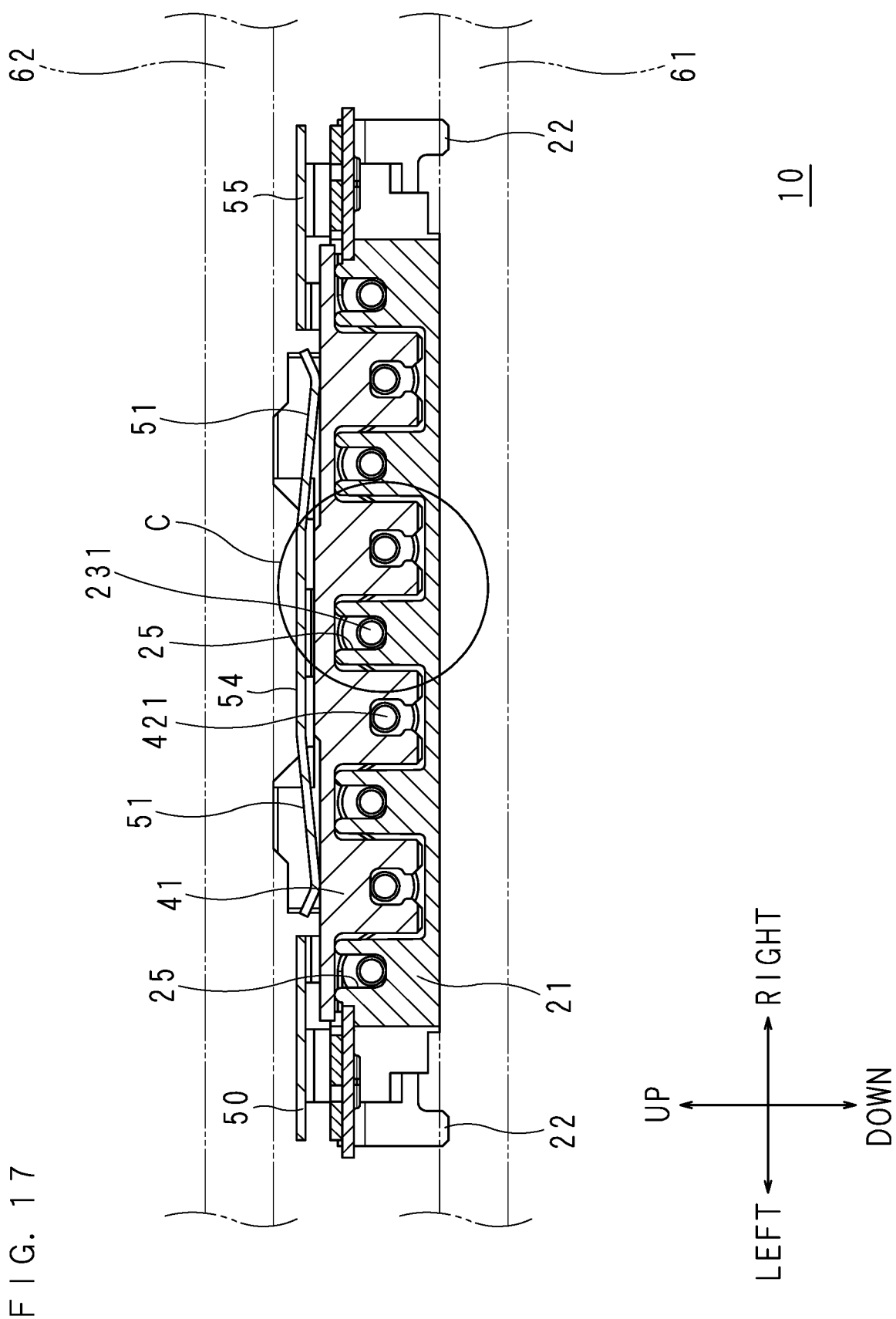
FIG. 17 is a cross-sectional view taken along line XVII-XVII of FIG. 15.

FIG. 15 is a top view of the actuator 10. FIG. 16 is a cross-sectional view taken along line XVI-XVI of FIG. 15. FIG. 17 is a cross-sectional view taken along line XVII- XVII of FIG. 15. FIG. 18 is a cross-sectional view taken along line XVIII-XVIII of FIG. 15. FIG. 19 is a cross-sectional view taken along line XIX-XIX of FIG. 15. With reference to FIG. 1 and FIGS. 15 to 19, the structure of the finished actuator 10 will be described.

As illustrated in FIGS. 1, 16 and 19, the top surface of the fastener supporting portions 26 abuts against the bottom surface of the supporting plate portions 55 to thereby fix the fastener 50 on the stator frame 21. As illustrated in FIGS. 17 and 18, the biasing springs 51 bias the top plate portion 47 toward the stator 20.

As illustrated in FIGS. 16 and 18, a space is provided between the bottom surface of the connecting portion 54 and the upper surface of the top plate portion 47. The function of the space will be described later.

As illustrated in FIG. 16, the five stator rollers 23 and the four mover rollers 42 are alternately arranged in parallel. The wire 31 is curved so as to alternately pass through the upside of the stator rollers 23 and the downside of the mover rollers 42. The lower edge portion of the stator terminals 22, which are connected to both ends of the wire 31, protrude downward exceeding the bottom surface of the stator frame 21.

As illustrated in FIG. 19, the wire 31 is swaged and fixed between the top surface of the terminal plate portion 223 of the stator terminal 22 and the second terminal plate 32. As described above, swaging is performed with the wire 31 held in the wire holding groove 33 provided on the second terminal plate 32, so that the shape of the cross section of the wire 31 at the swaged portion maintains a substantially circle.

Any shape, for example, oval, oblong, rectangle or the like may be taken for the cross section of the wire 31 after being swaged and fixed, as long as the wire 31 can be swaged and fixed between the stator terminal 22 and the second terminal plate 32 without a break in the wire 31.

The actuator 10 is used while being sandwiched from top and bottom between a first plate 61 and a second plate 62 as shown with the phantom line in FIG. 16 and FIG. 17. The first plate 61 is, for example, a printed-circuit board and has respective holes through which the tip ends of the stator terminals 22 can be inserted. The stator terminals 22 are connected to an electric circuit provided on the printed-circuit board by soldering.

The second plate 62 is a component, for example, a glass substrate set on the surface of the touch panel or the like that is to be touched by the user who uses the apparatus incorporated with the actuator, or a component around such a component.

Figure 20:
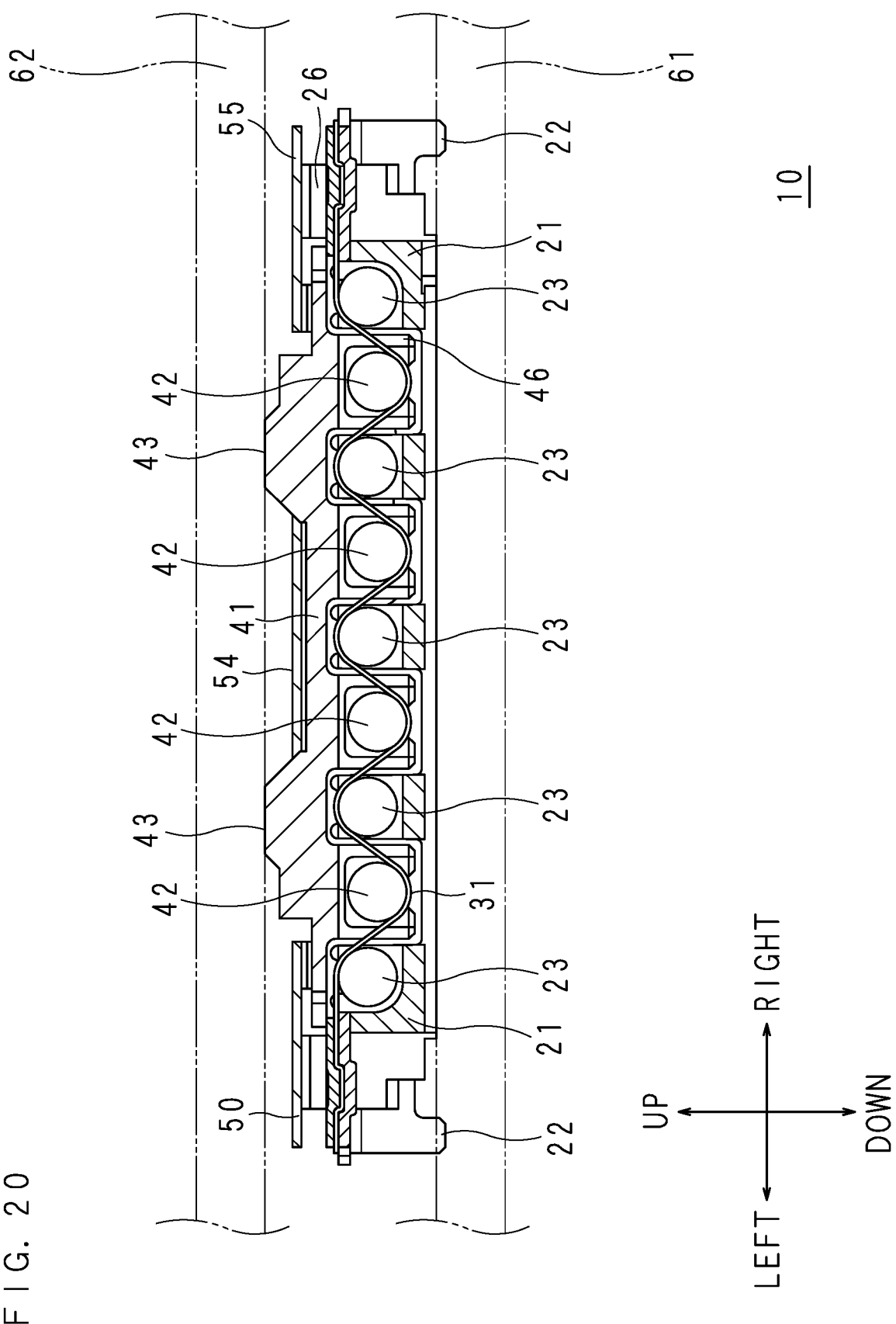
FIG. 20 illustrates an operating state of the actuator.

FIG. 20 illustrates an operating state of the actuator 10. With reference to FIGS. 16 and 20, the operation of the actuator 10 will be described.

FIG. 16 illustrates the initial state of the actuator 10. By applying pulse voltage across the stator terminals 22, the wire 31 instantly generates heat by Joule heat. The wire 31 instantly shortens if the temperature exceeds the transformation point. The shortening of the wire 31 upwardly moves the mover rollers 42. In accordance with the movement of the mover rollers 42, the mover 40 pushes the biasing springs 51 to move upward.

The above-described space between the bottom surface of the connecting portion 54 and the upper surface of the top plate portion 47 in FIGS. 16 and 18 is the space through which the upper surface of the top plate portion 47 can move if the mover 40 is moved. The space is high enough to prevent a collision between the connecting portion 54 and the top plate portion 47 if predetermined pulse voltage is applied across the right and left stator terminals 22.

After the completion of application of the pulse voltage, the generation of Joule heat is stopped. The heat generated in the wire 31 is dissipated to the outside through the stator rollers 23 and the mover rollers 42, which lowers the temperature of the wire 31 to the transformation point or below. By the action of the biasing springs 51, the wire 31 returns to its original length, which returns the actuator 10 to the state described with reference to FIG. 16.

The heat capacity of the wire 31 is much smaller than that of the entire actuator 10, so that even if the actuator 10 is operated by repetitively applying pulse voltage, the temperature of the entire actuator 10 is scarcely raised. It is noted that the actuator 10 may be attached with a cooling mechanism such as a Peltier element, a heatsink or the like if it is frequently operated.

As described above, by applying pulse voltage, the space between the first plate 61 and the second plate 62 instantly increases and then returns to the original state. This allows the user who touches the second plate 62 to have a click feeling.

By the action of the biasing springs 51, the mover 40 returns to the original height after every motion. This allows for the mover that repeats the motion of moving by a predetermined travel amount from a predetermined travel start position every time pulse voltage is applied. Thus, it is possible to achieve the actuator 10 that has stable characteristics.

The first wire passing groove 46 prevents the wire 31 from meandering and dropping off the mover roller 42 and the stator roller 23. By the first wire passing groove 46, the state of the wire 31 is uniformly maintained. This makes it possible to achieve the actuator 10 that operates with stability.

If imbalance depending on the position occur in the extension and contraction of the wire 31, the stator rollers 23 and the mover rollers 42 are automatically rotated to maintain the tension applied to the wire 31 uniform. Accordingly, even if a thin wire 31 is used, a break in the wire 31 can be prevented.

If a thin wire 31 is used, the resistance of the wire 31 increases. If Joule heat is generated by pulse signals of a constant voltage, the current value flowing in the wire 31 is thus reduced. This makes it possible to provide the actuator 10 that consumes small current.

Furthermore, if a thin wire 31 is used, the heat capacity of the wire 31 is reduced. Thus, the Joule heat generated by pulse driving is swiftly dissipated. This makes it possible to provide the actuator 10 that has a fast response speed. This can also provide the actuator 10 that causes less temperature rise due to the less Joule heat generated in the wire 31 even in the case of repetitive use.

The stator rollers 23 and the mover rollers 42 are respectively held in the stator frame 21 and the mover frame 41 having insulating properties, and are insulated from each other. Thus, even if a material having high thermal conductivity and high electrical conductivity, for example, copper or the like is used for the stator roller 23 and the mover roller 42, application of pulse voltage to both ends of the wire 31 is not prevented.

FIG. 21 is an enlarged view of the part C in FIG. 17. With reference to FIG. 21, the details of the width of the roller supporting portion 25 and the roller holding groove 45 will be described.

The diameter of the stator shaft portion 231, the diameter of the mover shaft portion 421, the width of the roller supporting portion 25, and the width of the roller holding groove 45 are respectively assumed as D1, D2, P and Q. In the present embodiment, D1=D2=0.5 mm, and the diameter of the central portion of the stator roller 23 and the diameter of the central portion of the mover roller 42 are both 1 mm. The sum p of the clearances of a single stator shaft portion 231 on both right and left sides with the roller supporting portions 25 is represented by Equation (1).

$$p = P - D1 \quad (1)$$

Likewise, the sum p of the clearances of a single mover shaft portion 421 on both right and left sides with the roller holding groove 45 is represented by Equation (2).

$$q = Q - D2 \quad (2)$$

If the stator frame 21 and the mover frame 41 are made of resin, and the stator roller 23 and the mover roller 42 are made of metal, p is desirably in the range of approximately 0.04 mm to 0.1 mm, and q is desirably larger than p by approximately 0.04 mm to 0.06 mm. It is more desirable that p is approximately 0.07 mm while q is approximately 0.12 mm.

The parts holding the stator shaft portion 231 and the mover shaft portion 421 are formed to have dimensions wide enough to include so-called clearances, which allows the stator roller 23 and the mover roller 42 to smoothly rotate. This achieves the actuator that prevents a break in the wire 31.

Figure 22:
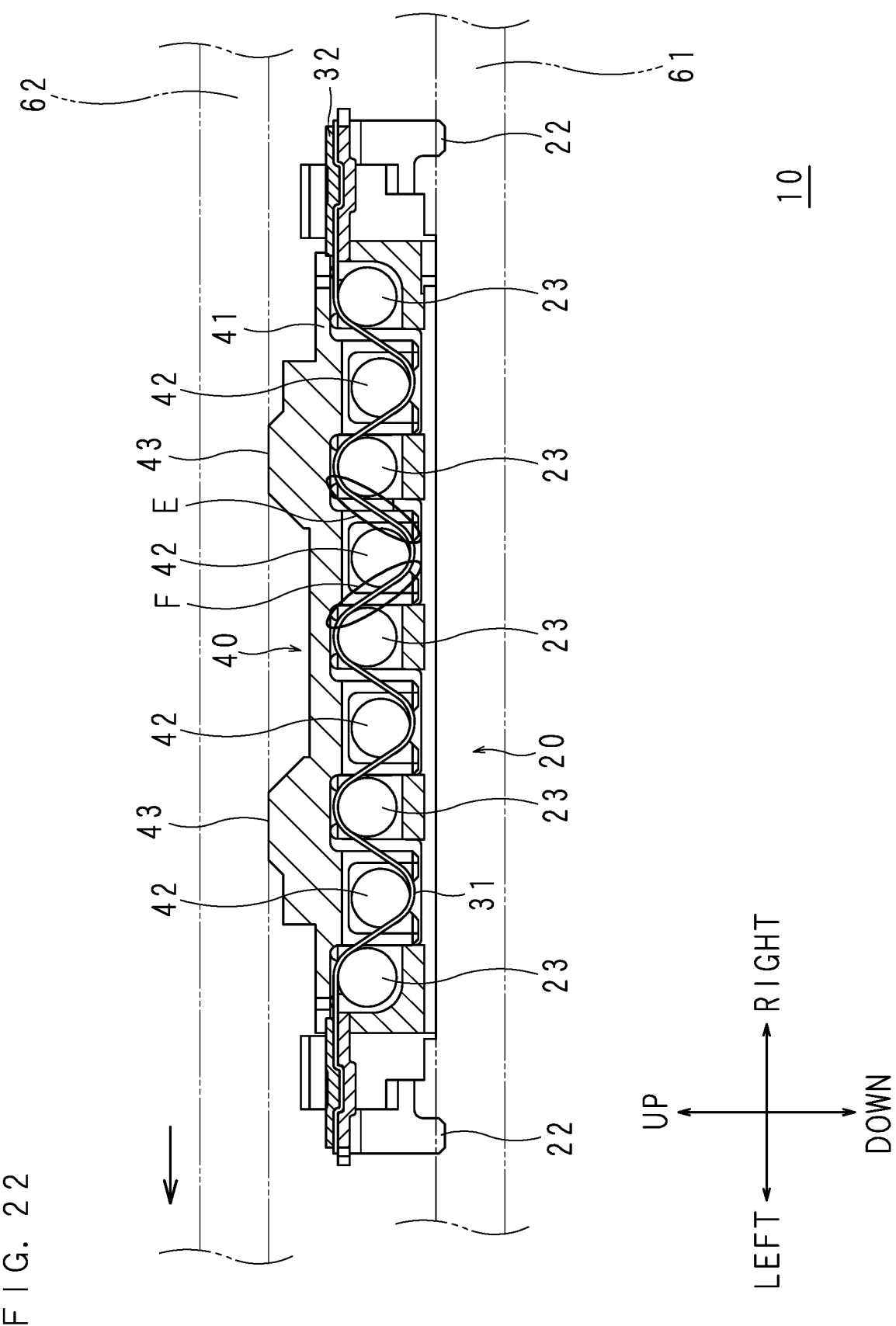
FIG. 22 illustrates a state where the mover is displaced to the left.

FIG. 22 illustrates a state where the mover 40 is displaced to the left. In FIG. 22, the fastener 50 is not illustrated. The second plate 62 is moving to the left. The mover 40 also moves to the left by being pulled by the second plate 62 and is displaced from its normal position.

Such a displacement may occur if an external force in the shearing direction is applied between the first plate 61 and the second plate 62, for example. The displacement may also occur even if an external force such as pressing force or the like is applied between the first plate 61 and the second plate 62 outside the position where the actuator 10 is fixed.

Such a displacement of the mover 40 from the normal position causes imbalance in tension applied to the wire 31 at the right and left of the mover roller 42. More specifically, at the part E indicated by the oval figure, that is, at the right side of the mover roller 42, tension is applied to the wire 31. Meanwhile, at the part F indicated by the oval figure, that is, at the left of the mover roller 42, the wire 31 is relieved.

In the case of a slight displacement, the stator shaft portion 231 moves to the left within the roller supporting portion 25 while the mover shaft portion 421 moves to the right within the roller holding groove 45, whereby the tension applied to the wire 31 is relieved and made uniform. Thus, a break in the wire 31 is prevented.

Even in the case of a large displacement, the stator rollers 23 and the mover rollers 42 are rotated to cause the wire 31 to be drawn from the left to the right of the stator roller 23, whereby the tension applied to the wire 31 is relieved and is made uniform. Thus, a break in the wire 31 is prevented. The rollers are rotatable, which also prevents the wire 31 from being broken due to the friction between the wire 31 and rollers.

Hence, it is possible to provide the actuator 10 that prevents the wire 31 from being broken even if various external forces are applied.

Setting the value of p as described with reference to FIG. 21 can limit the travel amount of the stator roller 23 in the right-left direction and prevent abnormal deformation such as bending or the like of the wire 31. The value of q is set to be larger than the value of p, whereby the mover rollers 42 swiftly move in accordance with the tilt and displacement of the mover 40, which prevents the wire 31 from being broken.

In other words, the stator rollers 23 are each supported so as to have clearances in the direction of array, and the mover rollers 42 are each supported so as to have larger clearances in the same direction, which allows the respective rollers to automatically move depending on the extension and contraction of the wire 31. Thus, the actuator 10 can be provided that automatically maintains the tension generated in the wire 31 uniform.

The stator terminals 22 and the stator rollers 23 are arranged adjacent to each other, and this prevents the wire 31 near the stator terminals 22 from moving in the up-down direction even if the mover 40 moves in the up-down direction. There is no force applied in the shearing direction, and this makes it possible to provide the actuator 10 that can prevent the wire 31 from being broken.

As described above, it is desirable that the height of the top surface of the terminal plate portions 223 on both right and left sides is substantially the same as the height of the upper edge of the five stator rollers 23. This prevents the wire 31 from bending between the right and left swaged portions 35 and the stator rollers 23 as illustrated in FIG. 16 and makes the wire 31 substantially linear. Thus, unnecessary stress applied to the wire 31 near the swaged portions 35 can be prevented. This can also prevent the wire 31 from being damaged due to rubbing of the wire 31 against the edge or the like of the second terminal plate 32.

The shape and material of the mover roller 42 may be different from those of the stator roller 23, though it is desirable that the mover roller 42 has the same shape and material as the stator roller 23 in terms of obtainment of even heat dissipation from the wire 31. Use of common components between the stator roller 23 and the mover roller 42 can reduce the cost of the actuator 10 and the labor of managing components.

The following describes the case where the actuator 10 is set to a touch panel. The actuator 10 is operated in accordance with operation performed on the touch panel by the user and moves the surface of the touch panel. This makes the user have sensation as if he or she operates a mechanical keyboard.

The apparatus to be attached with the actuator 10 is not limited to a touch-panel information apparatus such as a smartphone, a tablet, or the like. The actuator 10 may be attached to the handle, the seat or the like of a transport apparatus such as an automobile, a motorcycle, a bicycle, or the like. Additionally, the actuator 10 can be attached to any apparatus that can be touched for use by the user.

The actuator 10 is operated in accordance with the operation performed by the user to thereby enable feedback against the operation through tactile sensation. Moreover, the actuator 10 is operated if abnormality occurs during automatic driving, for example, which allows the user to notice it through tactile sensation.

The pressing portion 43 may take any shape depending on the portion to which the actuator 10 is mounted. For example, the pressing portion 43 may have a hole through which a pin is inserted from above or a threaded hole through which a screw is fastened. The pressing portion 43 may be a protrusion or a recess to be engaged with the portion to which the actuator 10 is to be mounted.

According to the present embodiment, the actuator 10 that consumes less power can be provided. According to the present embodiment, the actuator 10 that is compact and undergoes instant displacement can be provided. The actuator 10 in the present embodiment is fit for a so-called tactile device application that presents tactile sensation, for example, a click feeling or the like to the user.

According to the present embodiment, the actuator 10 that is easy to assemble can be provided. More specifically, the actuator that enables easy installation of the stator 20 and the mover 40 can be provided. Furthermore, the actuator 10 that enables easy installation of the stator 20, the wire 31 and the mover 40 can be provided. According to the present embodiment, it is possible to prevent the wire 31 from being broken during assembly.

The condition of the wire 31 can be observed from the bottom surface of the stator 20 during installation of the stator 20 and the mover 40. Thus, it is possible to provide the actuator 10 that enables prompt detection and prevention of a malfunction that may occur during the assembly process.

The stator roller 23 and the mover roller 42 are respectively supported at the stator shaft portions 231 and the mover shaft portions 421 each having a small diameter, so that the stator rollers 23 and the mover rollers 42 can be arranged close to each other in the right-left direction as illustrated in FIG. 16. This can achieve the compact size of the actuator 10.

Furthermore, the rotational moments exerted to the stator roller 23 and the mover roller 42 by the extension and the contraction of the wire 31 easily exceed the rotational moments by the frictional force produced in the stator shaft portions 231 and the mover shaft portions 421, respectively. This allows the stator rollers 23 and the mover rollers 42 to smoothly rotate in cooperation with the extension and contraction of the wire 31.

Here, the rotational moment exerted on the stator roller 23 and the rotational moment exerted on the mover roller 42 are respectively obtained by multiplying the force intended for the wire 31 to rotate the stator roller 23 and the mover roller 42 by the radius of the stator roller 23 and the radius of the mover roller 42. The rotational moment by the frictional force produced in the stator shaft portion 231 and the rotational moment by the frictional force in the mover shaft portion 421 are respectively obtained by multiplying the frictional force between the stator shaft portion 231 and the mover shaft portion 421 and the respective portions supporting them by the radius of the stator shaft portion 231 and the radius of the mover shaft portion 421.

The stator roller 23 and the mover roller 42 may be coated with film made of high lubricating materials. The film is thick enough so as not to prevent heat transmission between the stator roller 23 and the mover roller 42. More specifically, the thickness of the film is from approximately 1 μm to several tens μm.

Reduction in the friction between the stator shaft portion 231 and the roller supporting portion 25 and reduction in the friction between the mover shaft portion 421 and the roller holding groove 45 allow the stator roller 23 and the mover roller 42 to smoothly rotate, respectively. In addition, reduction in the friction between the stator roller 23 and the wire 31 as well as between the mover roller 42 and the wire 31 enables the wire 31 to smoothly extend and contract. Thus, a break in the wire 31 can be prevented.

The high lubricating materials as described above may have insulation properties. If the stator shaft portion 231 and the mover shaft portion 421 are coated with insulating materials, the stator frame 21 and the mover frame 41 may be made of electrically conductive materials.

The bottom surface of the stator frame 21 may be covered in advance with a transparent plate, or the like. After installation of the stator 20 and the mover 40, the bottom surface of the stator 20 may be covered with a plate or the like. This can prevent damage due to the entry of foreign materials to the actuator 10 without interfering the observation through the bottom surface of the stator during the assembly process. If there is little need for observing the installation process for the mover 40 to the stator 20 due to the stable assembly process, the stator frame 21 may have a closed-end and be opaque.

According to the present embodiment, the actuator 10 can be provided that prevents a break in the wire 31 if an external force is applied. According to the present embodiment, the actuator 10 can be provided that is easily mounted on a printed-circuit board or the like.

If the first plate 61 and the second plate 62 are used as means for biasing against each other, the actuator 10 need not to be provided with the biasing springs 51. Moreover, the actuator 10 may be provided without the fastener 50.

The actuator 10 includes five stator rollers 23 and four mover rollers 42, tough the number of stator rollers 23 and the number of mover rollers 42 are not limited to these numbers. The actuator 10 may have any other number of stator rollers 23 and mover rollers 42. The actuator 10 has one wire 31, though it may have any other number of wires 31. The dimensions of the respective parts of the actuator 10 are not limited to those described in the present embodiment.

The actuator 10 may be used with the stator 20 side thereof fixed closer to the part touched by the user.

Embodiment 2

The present embodiment relates to an actuator 10 that is suitable for application less likely to cause lateral displacement of the mover 40. Description of parts common to those in Embodiment 1 will not be repeated.

Figure 23:
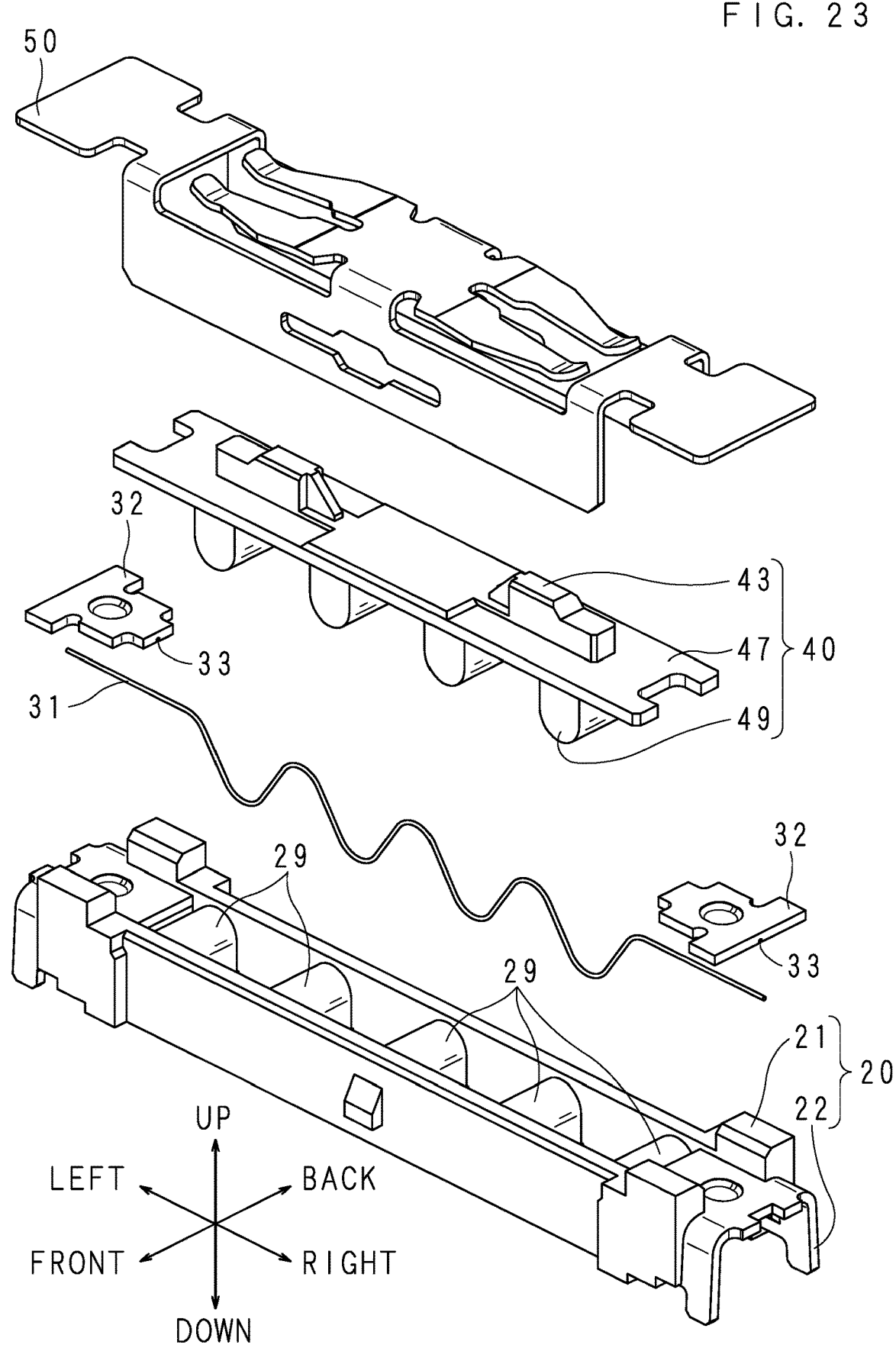
FIG. 23 is an exploded perspective view of an actuator in Embodiment 2.
Figure 24:
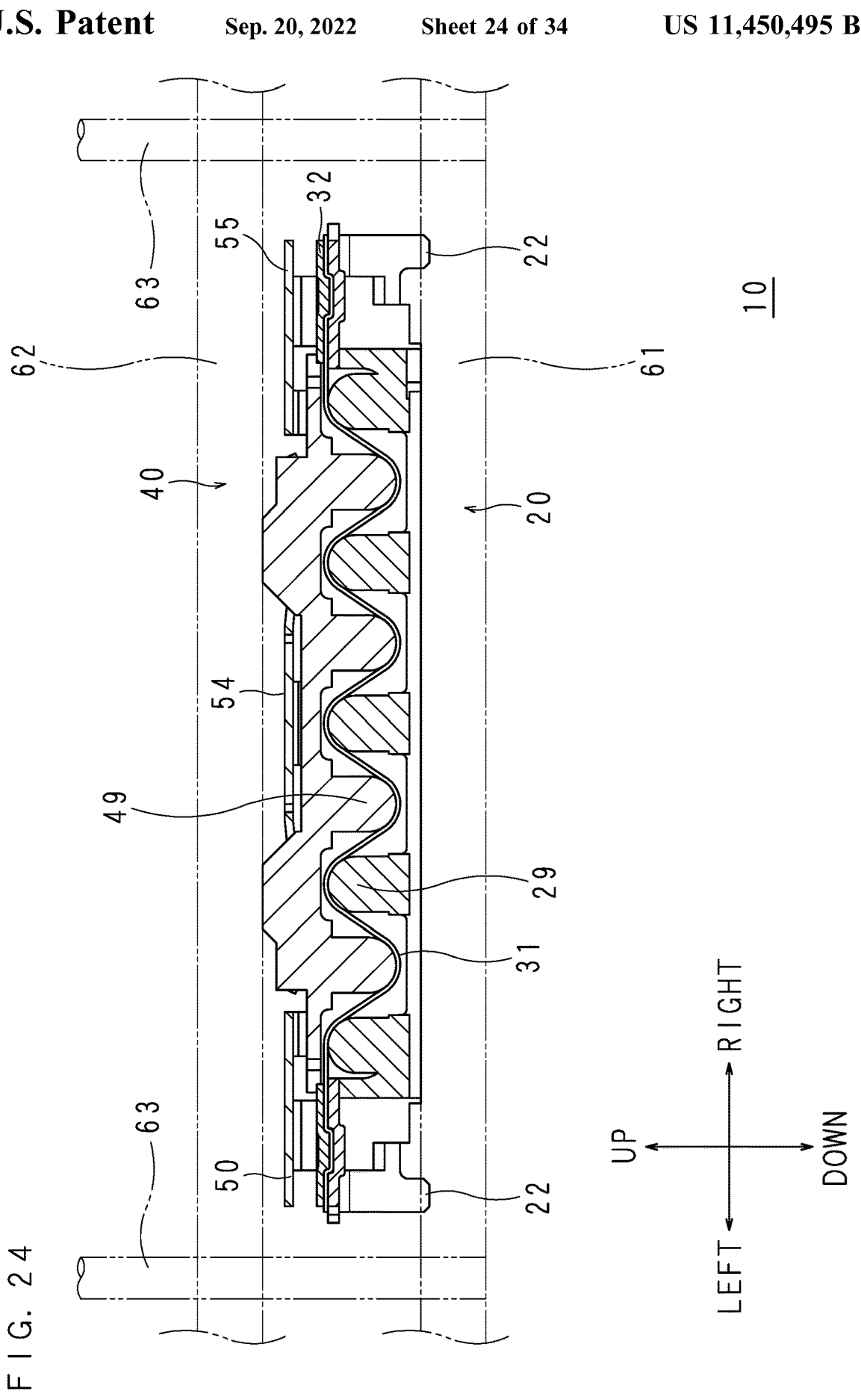
FIG. 24 is a cross-sectional view of the actuator in Embodiment 2.

FIG. 23 is an exploded perspective view of the actuator 10 in Embodiment 2. FIG. 24 is a cross-sectional view of the actuator 10 in Embodiment 2. The stator 20 has five stator protrusions 29 that are formed as an integral part of the stator frame 21. The top surface of each of the stator protrusions 29 has a substantially cylindrical surface. The mover 40 has four mover protrusions 49 that are formed as an integral part of the top plate portion 47. The bottom surface of each of the mover protrusions 49 has a substantially cylindrical surface.

The stator 20 and the mover 40 are desirably formed by injection molding of resin. The stator protrusion 29 and the mover protrusion 49 are more desirably coated with film made of materials having excellent lubricating ability.

The stator 20 and the mover 40 may be made of ceramic or metal. The stator 20 and the mover 40 may be made of materials different from each other. If the stator 20 and the mover 40 are made of electrically conductive materials, the stator protrusions 29 and the mover protrusions 49 are coated with film made of materials having insulation properties.

The second terminal plate 32 has a shallow recess at the central part in addition to the wire holding groove 33. When the stator terminal 22, the wire 31 and the second terminal plate 32 are swaged and fixed, the recess is used as a guide to position punching.

Components such as sliding struts 63 may desirably be provided for restricting the movement other than the parallel movement in the up-down direction of the first plate 61 and the second plate 62 as illustrated by the dash-dot-dot line in FIG. 24 when the actuator 10 in the present embodiment is used. The restriction on the lateral displacement of the mover 40 can prevent a break in the wire 31 during use.

Embodiment 3

Figure 25:
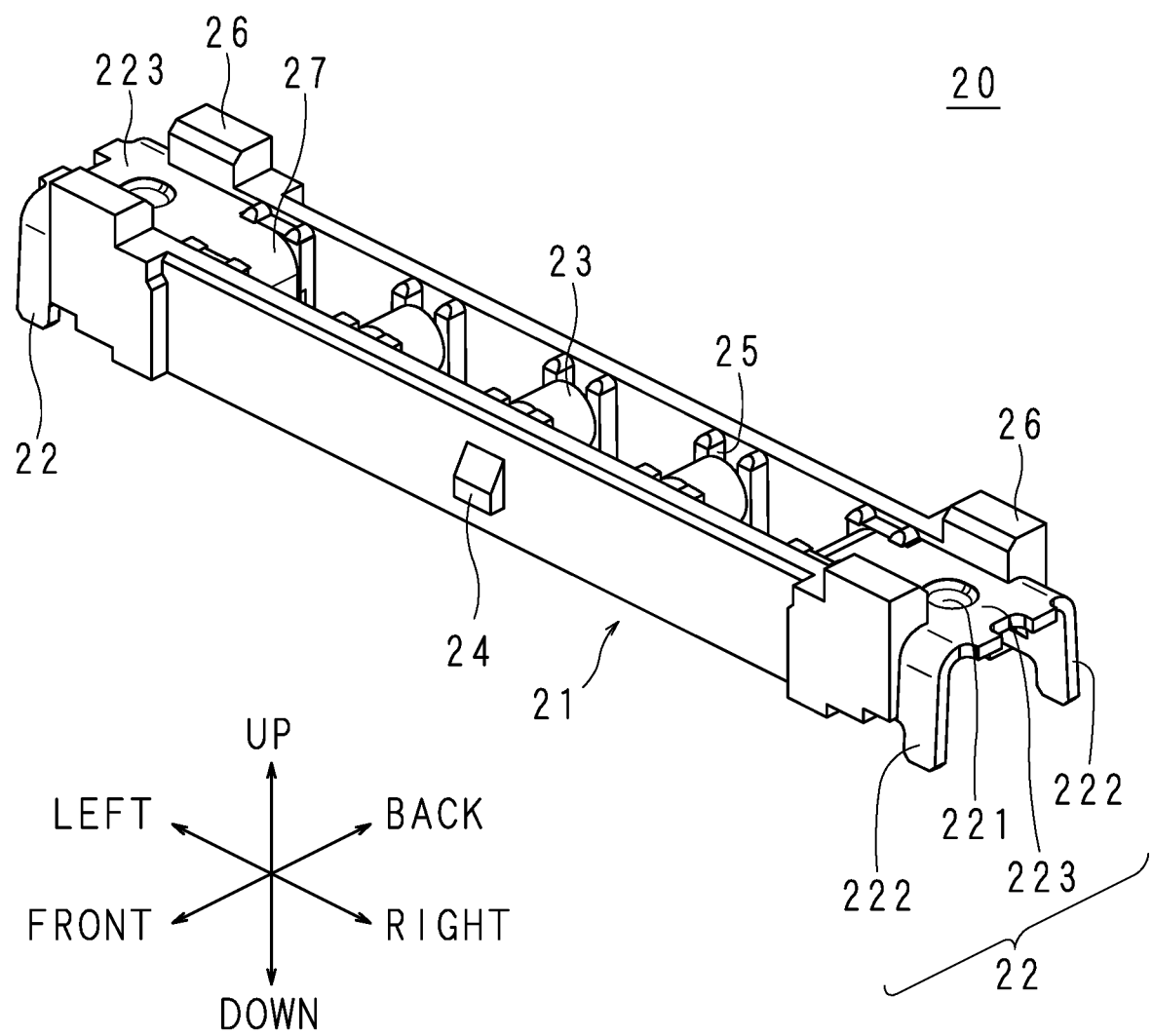
FIG. 25 is a perspective view of a stator in Embodiment 3.
Figure 26:
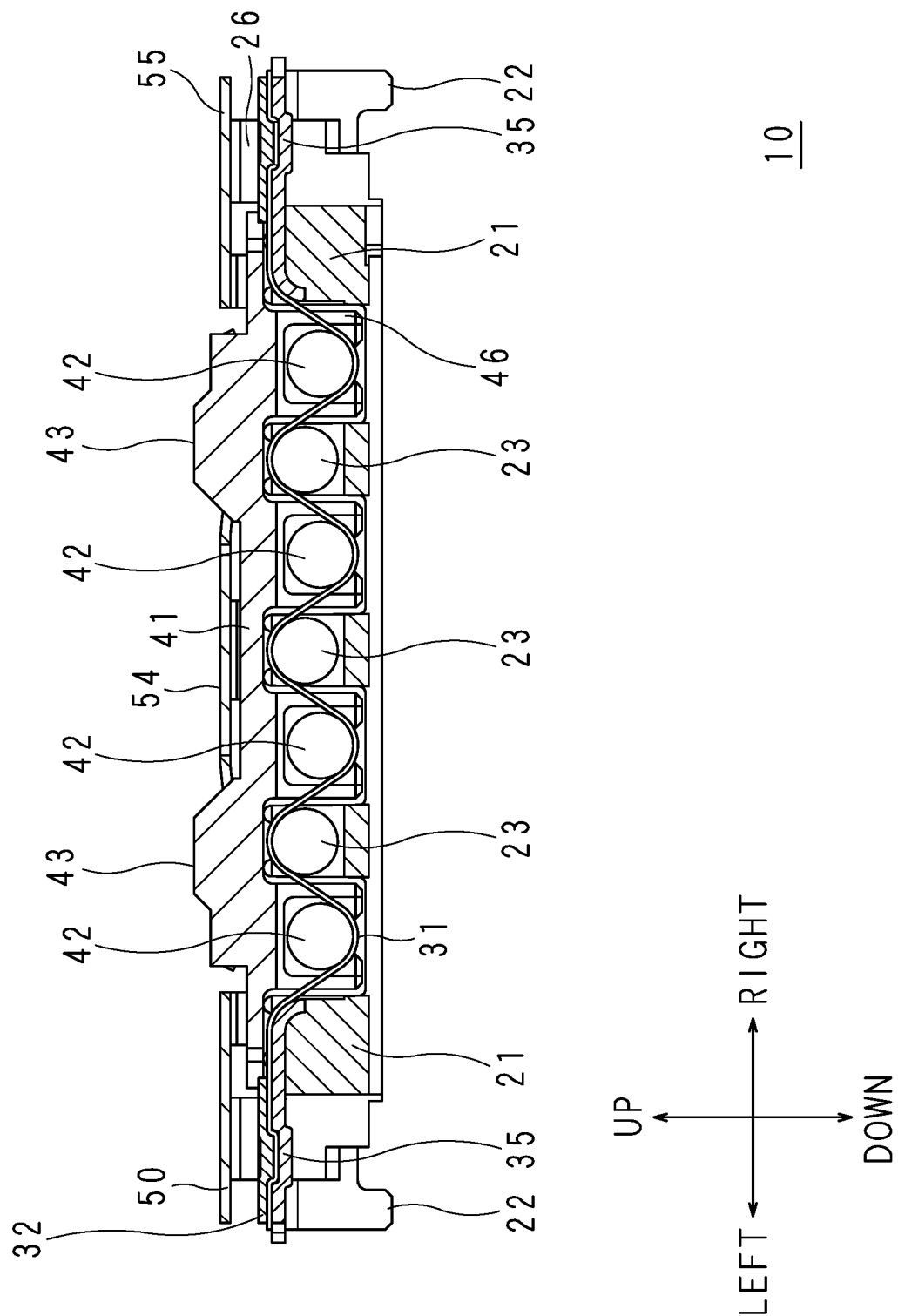
FIG. 26 is a cross-sectional view of an actuator in Embodiment 3.

The present embodiment relates to an actuator 10 having a curved surface portion 27 at an end of each of the stator terminals 22. Description of parts common to those in Embodiment 1 will not be repeated. FIG. 25 is a perspective view of a stator 20 in Embodiment 3. FIG. 26 is a cross-sectional view of the actuator 10 in Embodiment 3.

The stator terminal 22 has the curved surface portion 27 extending in the same direction as the terminal leg portions 222 from the far side from the terminal leg portions 222 of the terminal plate portion 223. The curved surface portion 27 has curvature substantially the same as that of the stator roller 23. The stator has three stator rollers 23.

As illustrated in FIG. 26, the wire 31 is curved along the curved surface portion 27 at both ends and is in contact with the mover rollers 42. Joule heat is not generated at the parts of the wire 31 that are in contact with the stator terminals 22, which are conductors, and this causes no contraction of the wire 31.

Assuming that the stator terminal 22 or the wire 31 are coated with non-conductive film, the Joule heat generated in the wire 31 is rapidly dissipated to the stator terminals 22, which causes no temperature rise in the wire 31. Thus, no contraction of the wire 31 also occurs at the part that is in contact with the stator terminal 22.

Unlike Embodiment 1, the part of the wire 31 retained in the air in the right-left direction is not present between the terminal plate portion 223 and the stator roller 23 (see FIG. 14). Thus, it is possible to provide the actuator 10 for which the expansion and contraction of the wire 31 upon application of pulse voltage efficiently contributes to the movement of the mover 40 in the front-back direction.

Embodiment 4

Figure 27:
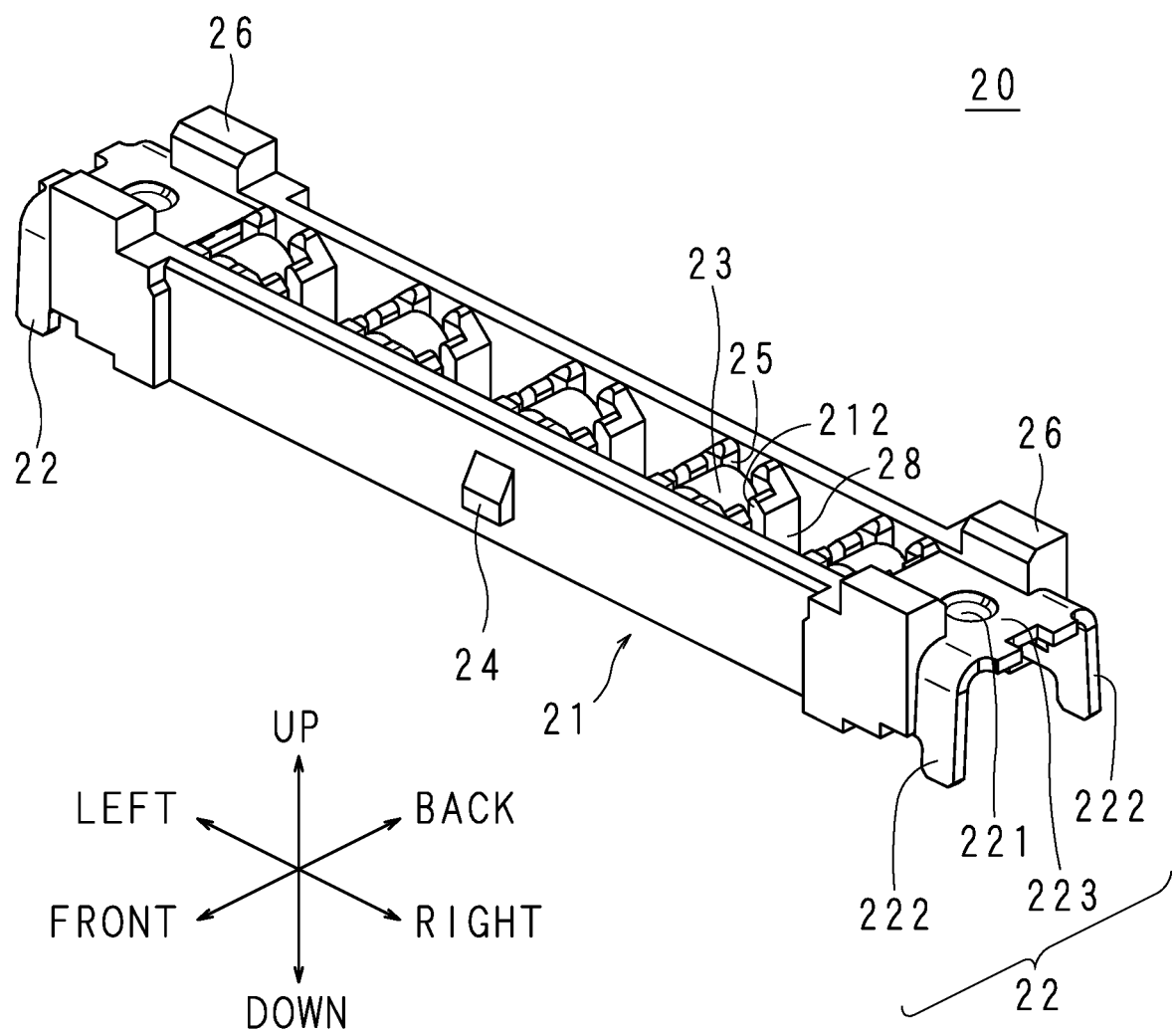
FIG. 27 is a perspective view of a stator in Embodiment 4.
Figure 28:
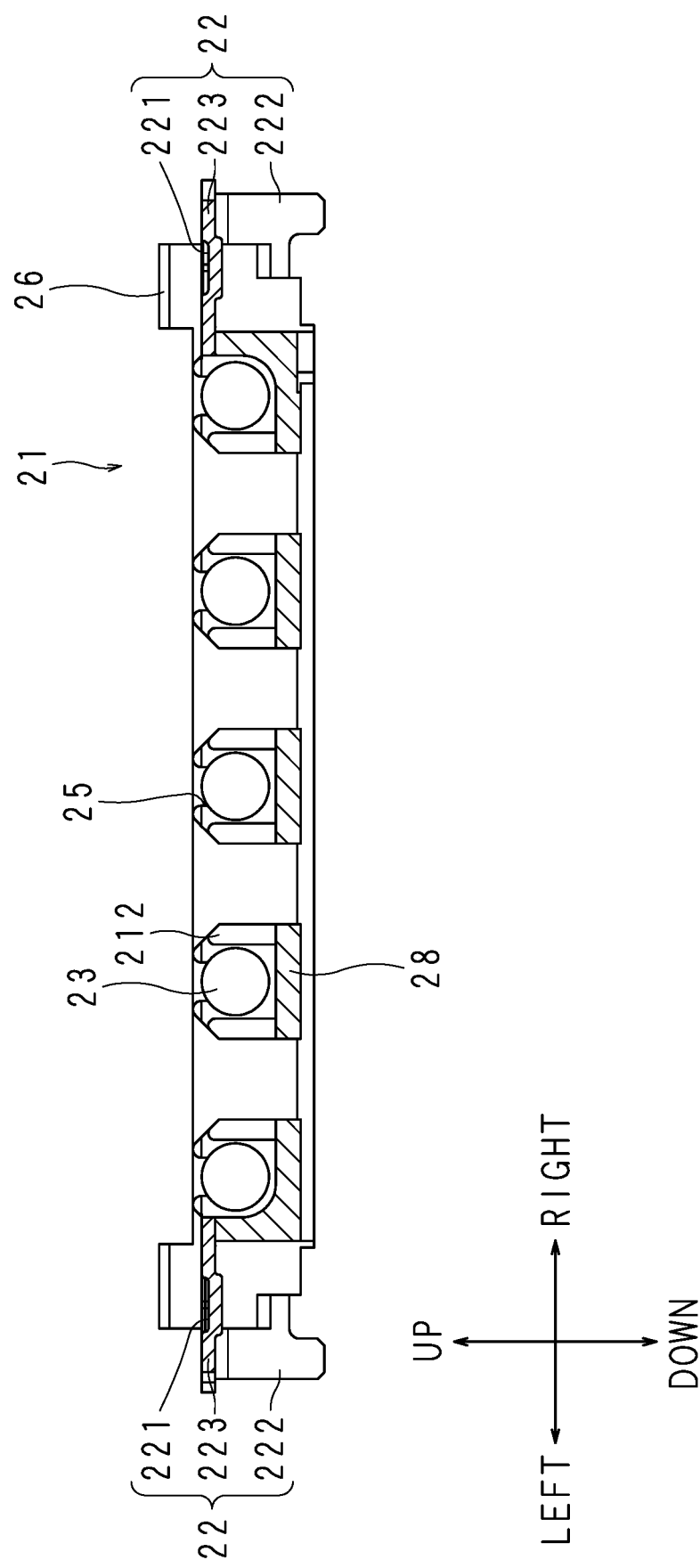
FIG. 28 is a cross-sectional view of the stator in Embodiment 4.

The present embodiment relates to an actuator 10 having a stator 20 with a groove that prevents misalignment of the wire 31 from occurring. Description of parts common to those in Embodiment 1 will not be repeated. FIG. 27 is a perspective view of the stator 20 in Embodiment 4. FIG. 28 is a cross-sectional view of the stator 20 in Embodiment 4.

The stator frame 21 is a substantially rectangular frame elongated in the right-left direction, and has five pairs of roller supporting portions 25 between the inner surfaces of the front and rear walls thereof. The roller supporting portions 25 in each pair are opposed to each other, and each of the roller supporting portions is a substantially U-shaped groove that opens at the top. The width of the opening portion of the roller supporting portion 25 is a little greater than the diameter of the stator shaft portion 231. A single stator roller 23 is rotatably supported by a pair of opposing roller supporting portions 25.

The front wall and the rear wall of the stator frame 21 are connected by substantially U-shaped connection portions 28 that open at the top. Each of the connection portion 28 encloses the right, left and the bottom of the stator roller 23. The connection portions 28 prevent the deformation, such as extension of the stator frame 21 in the front-back direction.

On the right and left walls of the connection portion 28, a second wire passing groove 212 is provided that divides the connection portion 28 between the front and back parts. The second wire passing groove 212 has a width greater than the contour of the wire 31.

FIG. 29 is a perspective view of the mover 40 in Embodiment 4. The mover 40 has the mover frame 41 and the four mover rollers 42.

The mover frame 41 has the top plate portion 47 and the four rectangular box-shaped roller holding portions 44. The top plate portion 47 has a substantially rectangular plate shape being substantially the same in length as the stator frame 21 in the front-back direction and being shorter in the right-left direction than the stator frame 21. The roller holding portions 44 are arrayed in the right-left direction on the lower surface of the top plate portion 47 with opening portions facing downward. The right wall and left wall of the roller holding portion 44 are greatly opened.

On the front and rear walls of the mover frame 41, roller holding grooves 45 are provided. A single mover roller 42 is rotatably supported inside the roller holding portion 44 by a pair of opposing roller holding grooves 45. The action of the retainer provided at the entrances of the roller holding grooves 45 prevents the mover roller 42 from falling even if the top plate portion 47 is placed at the upper side while holding the mover 40.

The stator 20 described with reference to FIG. 27 and FIG. 28 and the mover 40 described with reference to FIG. 29 are installed and fixed with the fastener 50 to finish the actuator 10.

The wire 31 has a wavy shape alternately passing through the upper side of the stator rollers 23 and the lower side of the mover rollers 42. The wire 31 passes through the second wire passing grooves 212 between the stator rollers 23 and the mover rollers 42.

According to the present embodiment, the mover 40 is lightweight, and thus it is possible to provide the actuator 10 that consumes less power.

Embodiment 5

Figure 30:
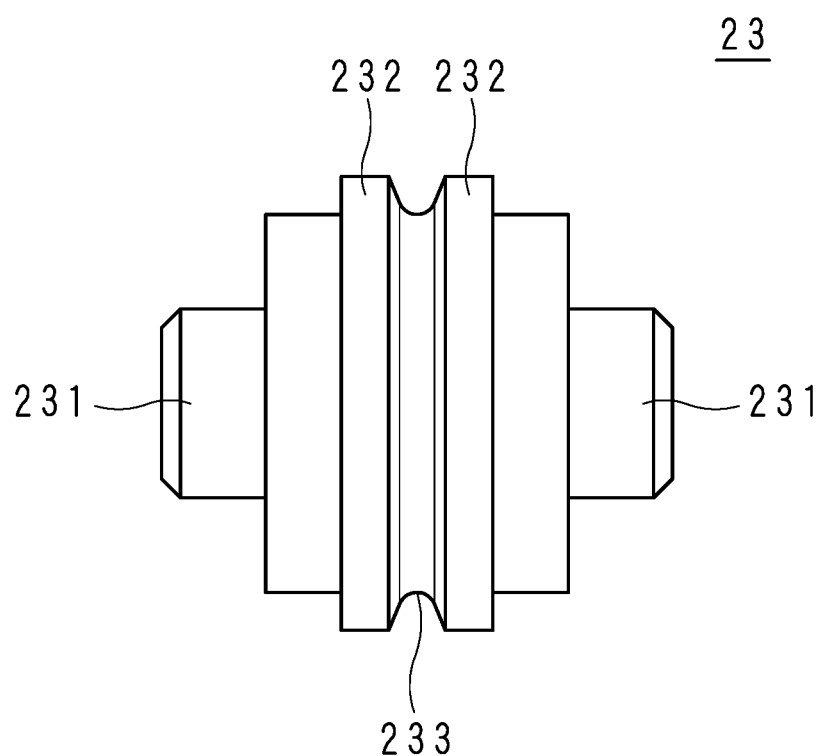
FIG. 30 is an elevation view of a stator roller in Embodiment 5.

The present embodiment relates to an actuator 10 having a roller with a groove for guiding the wire 31. Description of parts common to those in Embodiment 1 will not be repeated. FIG. 30 is an elevation view of a stator roller 23 in Embodiment 5. It is noted that a mover roller 42 has a similar shape.

The stator roller 23 is cylindrical. The stator roller 23 has cylindrical stator shaft portions 231 coaxially protruding from both end surfaces thereof. The stator roller 23 has two ridge portions 232 on its side surface. The ridge portions 232 are striped protrusions circumferentially running about the central axis of the stator roller 23. The two ridge portions 232 are parallel with each other to form a guide groove 233 therebetween.

When looking the stator roller 23 taken in cross-section including the central axis, the guide groove 233 has an arcuate bottom having a radius about 10% greater than that of the wire 31.

Figure 31:
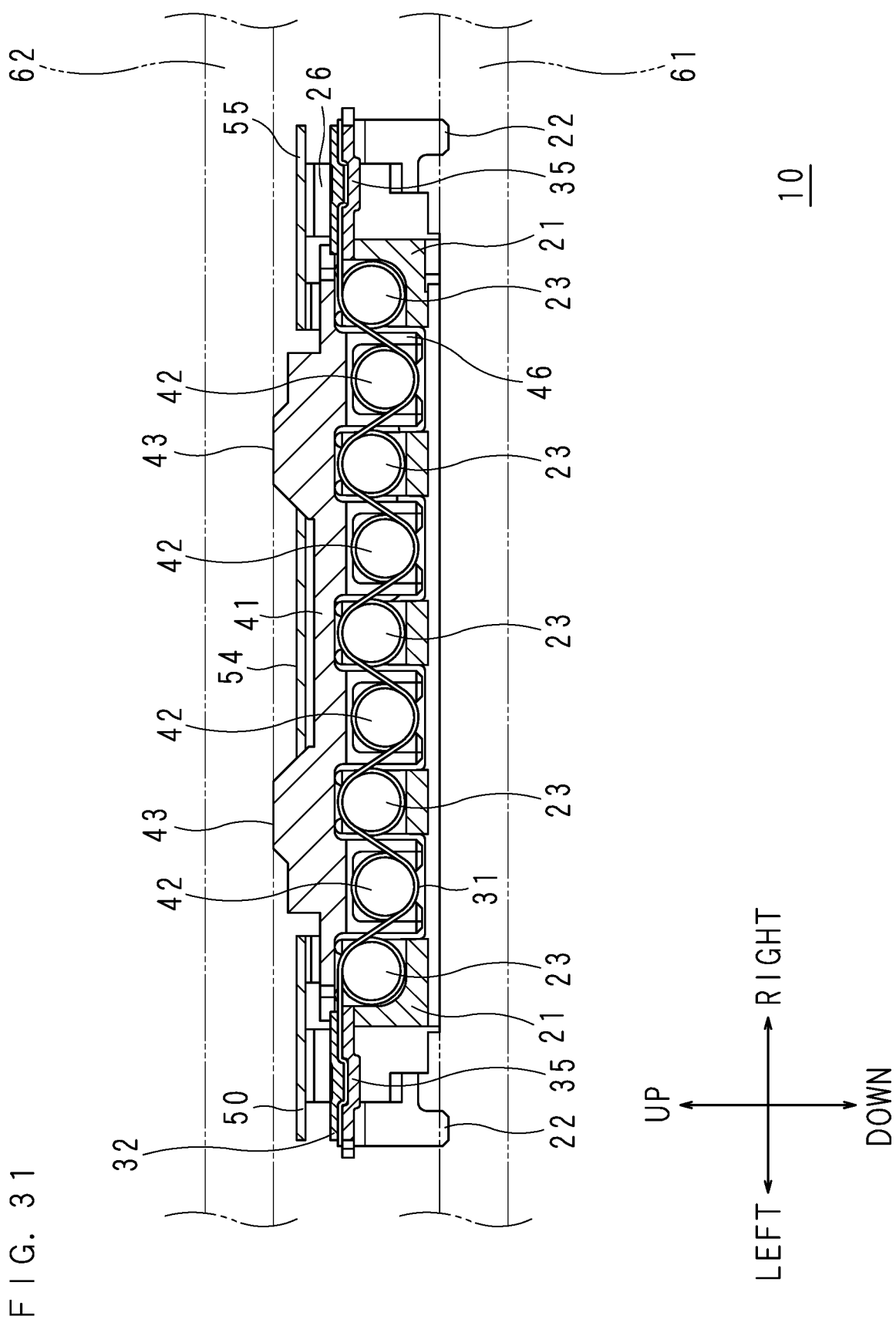
FIG. 31 is a cross-sectional view of an actuator in Embodiment 5.

FIG. 31 is a cross-sectional view of the actuator 10 in Embodiment 5. The wire 31 is guided along the guide groove 233, which prevents misalignment of the wire 31 in the front-back direction. The bottom of the guide groove 233 and the contour of the wire 31 are close to each other, which enables easy transmission of the heat generated in the wire 31 to the stator rollers 23 and the mover rollers 42. Thus, the wire 31 is swiftly cooled after application of pulse signals.

Note that any one of the stator roller 23 and the mover roller 42 may take the shape described with reference to FIG. 30. Some of the plurality of stator rollers 23 and mover rollers 42 may take the shape described with reference to FIG. 30.

Embodiment 6

The present embodiment relates to an actuator 10 for which the stator rollers 23 on both sides and the stator terminals 22 adjacent to the respective stator rollers 23 are electrically continuous. Description of parts common to those in Embodiment 1 will not be repeated.

Figure 32:
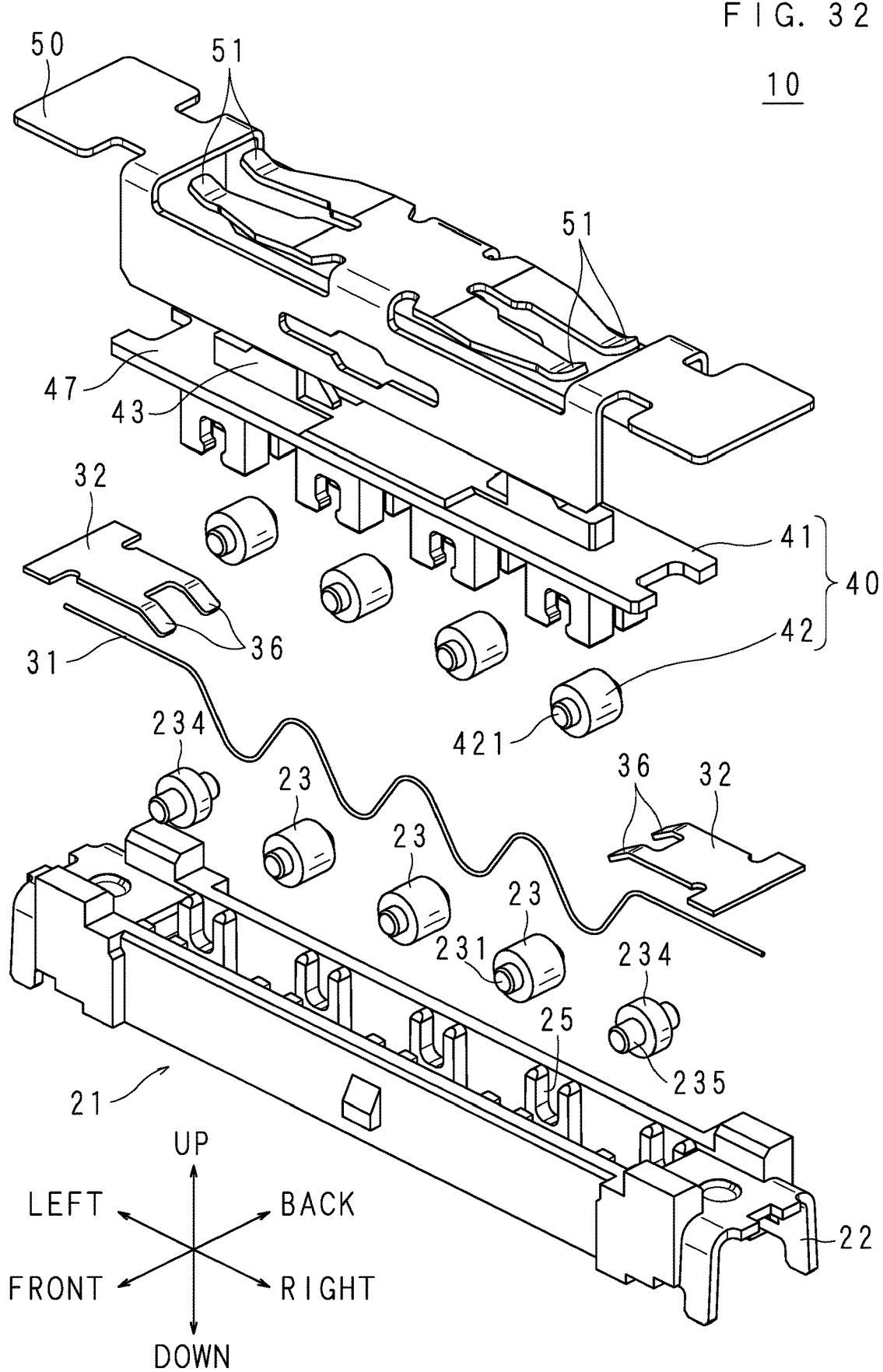
FIG. 32 is an exploded perspective view of an actuator in Embodiment 6.

FIG. 32 is an exploded perspective view of an actuator 10 in Embodiment 6. The stator 20 has the stator frame 21, the stator terminals 22 and five stator rollers 23. Among the five stator rollers 23, the stator rollers 23 on both ends located adjacent to the stator terminals 22 are called end stator rollers 234 having a different shape from the other stator rollers 23.

The end stator rollers 234 each have a cylindrical shape having an outer diameter the same as that of the stator roller 23 and having a height lower than that of the stator roller 23. The end stator roller 234 has cylindrical end stator shaft portions 235 coaxially protruding from both end surfaces thereof. The height of the end stator roller 234 including the end stator shaft portions 235 is the same as that of the stator roller 23 including the stator shaft portions 231.

The end stator roller 234 is made of materials having high thermal conductivity and high electrical conductivity. The material of the end stator roller 234 is desirably copper. If aluminum is used for the material of the end stator roller 234, the end stator roller 234 is coated with film having high electrical conductivity such as copper plating or the like. This is because aluminum tends to form non-conductive oxide film on its surface.

A second terminal plate 32 is a substantially T-shaped plate. The second terminal plate 32 has a bifurcated brush portion 36 at the tip end of the part corresponding to the leg of the "T." The brush portion 36 bends obliquely downward. The second terminal plate 32 is made of metal having high electrical conductivity such as brass, phosphor bronze or the like.

Figure 33:
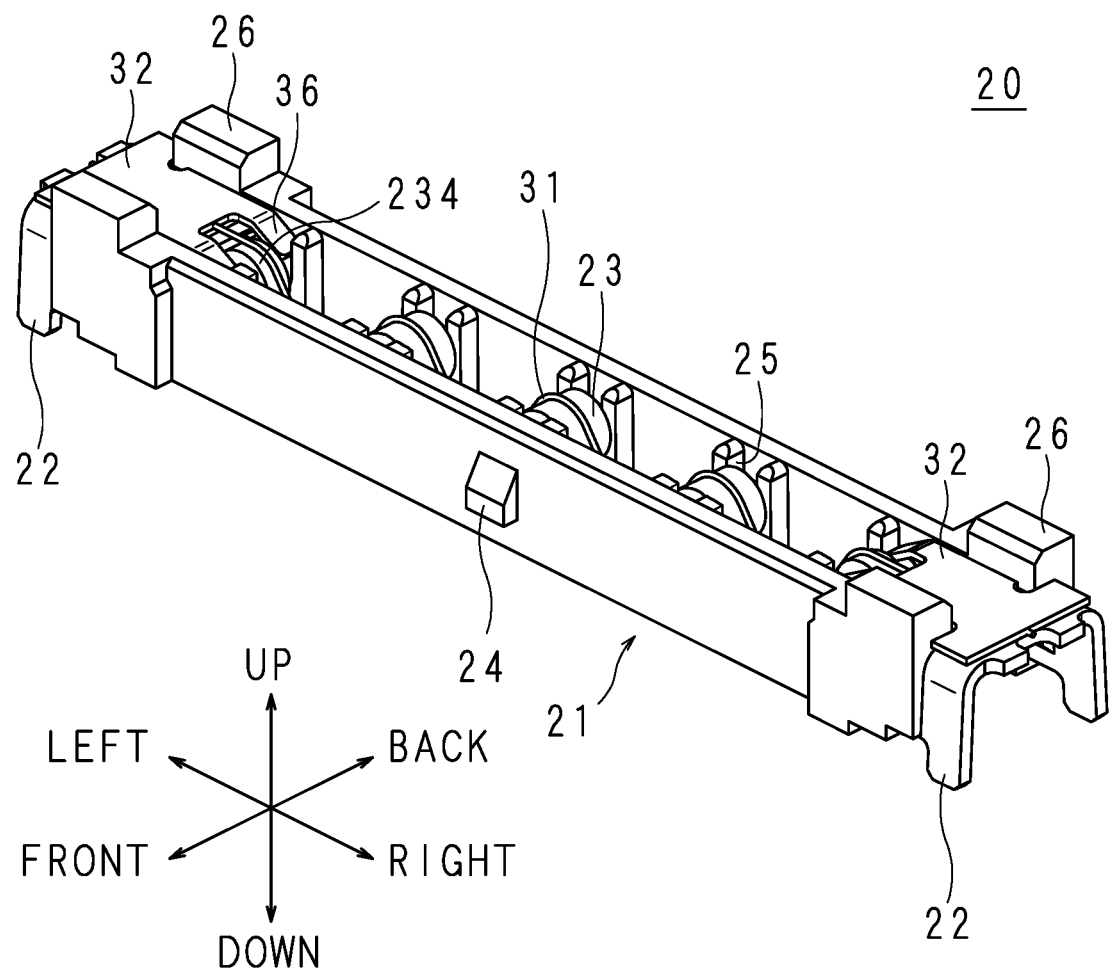
FIG. 33 is a perspective view of the actuator from which a fastener and a mover in Embodiment 6 are removed.
Figure 34:
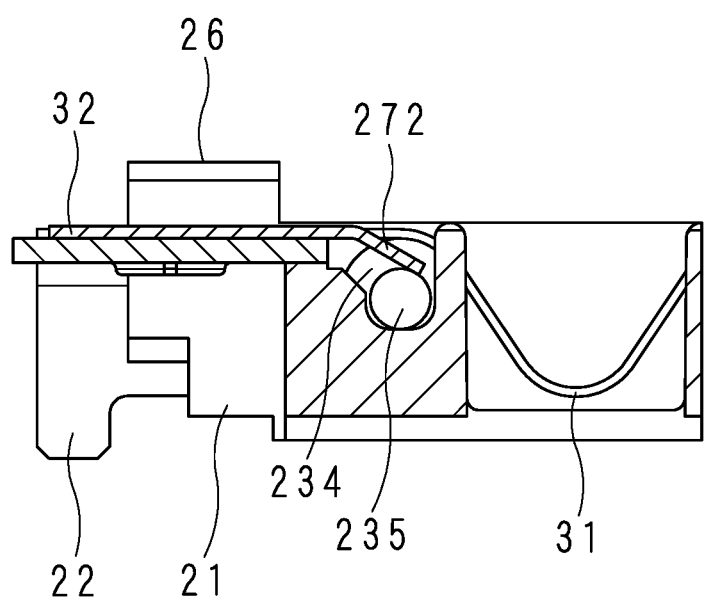
FIG. 34 is a partially enlarged cross-sectional view of the actuator from which the fastener and the mover in Embodiment 6 are removed.

FIG. 33 is a perspective view of the actuator 10 from which the fastener 50 and the mover 40 in Embodiment 6 are removed. FIG. 34 is a partially enlarged cross-sectional view of the actuator from which the fastener 50 and the mover 40 in Embodiment 6 are removed.

The brush portion 36 is pressed against the end stator shaft portions 235. Thus, the end stator roller 234 is rotatable and is electrically continuous with the stator terminal 22 through the brush portion 36, the second terminal plate 32 and the swaged portion 35. In other words, the brush portion 36 and the end stator roller 234 form a so-called slip ring structure.

According to the present embodiment, no current flows in the wire 31 between the stator terminal 22 and the end stator roller 234. Thus, pulse voltage is applied across the end stator rollers 234 on both sides. Pulse voltage is applied to only the parts that contribute to the operation of the mover 40, and thus it is possible to provide the actuator 10 with low power consumption and high power saving.

The technical features (elements) described in the embodiments can be combined with each other and can form a new technical feature by the combination.

It is to be understood that the embodiments disclosed here are illustrative in all respects and not restrictive. The scope of the present disclosure is defined by the appended claims, not by the above-mentioned meaning, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

The invention claimed is:

1. An actuator, comprising:
    a stator having a plurality of stator rollers each of which has a stepped cylindrical shape having stator shaft portions on both ends that are thinner than a central portion of the plurality of stator rollers and groove-shaped roller supporting portions that rotatably support the respective stator shaft portions on the both ends so as to have clearances in a direction in which the plurality of stator rollers are disposed;
    a mover having a mover roller disposed between the plurality of stator rollers and roller holding grooves that rotatably support both ends of the mover roller so as to have clearances larger than the clearances of the groove-shaped roller supporting portions in the direction in which the plurality of stator rollers are disposed; and
    a wire made of a shape memory alloy that is disposed between each of the plurality of stator rollers and the mover roller and has both ends connected to respective two stator terminals provided in the stator.

2. The actuator according to claim 1, wherein the mover roller has a stepped cylindrical shape having mover shaft portions on the both ends that are thinner than a central portion of the mover roller, and is supported by the mover at the mover shaft portions.

3. The actuator according to claim 1, wherein each of the plurality of stator rollers has a same shape as the mover roller.

4. The actuator according to claim 1, wherein each of the plurality of stator rollers or the mover roller has a guide groove for guiding the wire.

5. The actuator according to claim 1, wherein each of the plurality of stator rollers or the mover roller has a film having lubricating ability.

6. The actuator according to claim 1, further comprising a second terminal plate with a wire holding groove corresponding to the wire, and
    the wire is placed between each of the two stator terminals and the wire holding groove, and
    the second terminal plate is swaged and fixed to each of the two stator terminals.

7. The actuator according to claim 1, wherein the wire is linear between each of the two stator terminals and a stator roller of the plurality of stator rollers adjacent to each of the two stator terminals among the plurality of stator rollers.

8. The actuator according to claim 1, wherein each of the two stator terminals is electrically continuous with a stator roller of the plurality of stator rollers adjacent to each of the two stator terminals among the plurality of stator rollers.

9. The actuator according to claim 1, further comprising a biasing spring that is held by the stator and that biases the mover against the stator.

10. The actuator according to claim 9, wherein the biasing spring extends from a connecting portion of a fastener that has two sheets of side plate portions to be attached to the stator and the connecting portion connecting the side plate portions with the mover sandwiched between the fastener and the stator.

11. A manufacturing method for an actuator, comprising:
attaching a plurality of stator rollers each of which has a stepped cylindrical shape having stator shaft portions on both ends that are thinner than a central portion of the plurality of stator rollers to a stator having groove-shaped roller supporting portions that rotatably support the respective stator shaft portions so as to have clearances in a direction in which the plurality of stator rollers are disposed;
rotatably attaching both ends of a mover roller to a mover having roller holding grooves that rotatably support the respective ends of the mover roller so as to have clearances larger than clearances of the groove-shaped roller supporting portions in the direction in which the plurality of stator rollers are disposed;
disposing a wire made of a shape memory alloy between each of the plurality of stator rollers and the mover roller; and
connecting both ends of the wire made of the shape memory alloy to respective two stator terminals provided in the stator.

\* \* \* \* \*